United States Patent [19]
Carrette et al.

[11] Patent Number: 4,975,865
[45] Date of Patent: Dec. 4, 1990

[54] METHOD AND APPARATUS FOR REAL-TIME CONTROL

[75] Inventors: George J. Carrette, Concord; James E. Clancy, Chelmsford, both of Mass.; Gregory H. Fossheim, Hollis, N.H.

[73] Assignee: Mitech Corporation, Concord, Mass.

[21] Appl. No.: 359,871

[22] Filed: May 31, 1989

[51] Int. Cl.⁵ .................. G06F 15/46; G06F 15/18
[52] U.S. Cl. .................. 364/513; 364/500; 364/550; 364/139
[58] Field of Search ........... 364/500, 513, 550, 139, 364/496, 148, 300, 131–138

[56] References Cited

U.S. PATENT DOCUMENTS

| | | | |
|---|---|---|---|
| 4,644,479 | 2/1987 | Kemper et al. | 364/550 |
| 4,648,044 | 3/1987 | Hardy et al. | 364/513 |
| 4,649,515 | 3/1987 | Thompson et al. | 364/900 |
| 4,675,829 | 6/1987 | Clemenson | 364/513 |
| 4,730,259 | 3/1988 | Gallant | 364/513 |
| 4,752,890 | 6/1988 | Natarajan et al. | 364/513 |
| 4,754,409 | 6/1988 | Ashford et al. | 364/513 |
| 4,757,506 | 7/1988 | Heichler | 371/43 |
| 4,763,277 | 8/1988 | Ashford et al. | 364/513 |
| 4,825,353 | 4/1989 | Jenkins | 364/513 |
| 4,907,167 | 3/1990 | Skeirik | 364/513 |

FOREIGN PATENT DOCUMENTS

| | | |
|---|---|---|
| 0184088 | 3/1974 | European Pat. Off. . |
| 0205873 | 2/1981 | European Pat. Off. . |
| 0184087 | 10/1984 | European Pat. Off. . |
| 3621859 | 9/1981 | Fed. Rep. of Germany . |
| 63209917 | 2/1975 | Japan . |
| 8706371 | 3/1971 | PCT Int'l Appl. . |

OTHER PUBLICATIONS

Moore et al., "Real-Time Expert System for Process Control", Reprinted from IEEE 1984 Proceedings of the First Conference on Artificial Intelligence Applications, pp. 569–576.
Moore, "Expert Systems in Process Control", TAPPI 4/22/86.
Moore, "Large Expert Systems for Process Control", IFAC-Germany, Jul., 1987, pp. 1–13.

*Primary Examiner*—Allen MacDonald
*Attorney, Agent, or Firm*—Lahive & Cockfield

[57] ABSTRACT

Digital processing methods and apparatus for monitoring, controlling, and simulating industrial processes operate on data signals representative of process parameter values and generate response values representative of desired or requested process parameter values. A knowledge base stores knowledge of the industrial process in the form of rules, and an inference engine applied the rules to calculate the response values. A time-stamp value is assigned to each data signal, representing the time of receipt of each signal. Currency evaluation elements, responsive to user-selected currency range values and the time-stamp signals, assign an expiration-time value to the data signals and disregard data signals having an expiration-time value outside a corresponding user-selected currency range value.

26 Claims, 10 Drawing Sheets

METHOD AND APPARATUS FOR REAL-TIME CONTROL

BACKGROUND OF THE INVENTION

This invention relates generally to systems for digital information processing, and, more particularly, relates to apparatus and methods for providing real-time monitoring, control, and simulation of industrial processes.

Modern industrial plants, including nuclear and fossil-fuel power plants, refineries, and chemical plants, typically utilize distributed monitoring and control systems which generate significant numbers of plant process measurement values and alarm status signals. Experience has demonstrated that human operators are unable to continuously monitor and interpret large volumes of data, especially during process upset conditions. The results of such operator overload range from non-optimal plant operation to disastrous process upset, with concomitant economic loss.

A number of computer-based systems have been proposed or developed to address this problem, and to provide monitoring and control of industrial processes. Certain such systems utilize expert systems for evaluating process parameters in accordance with knowledge expressed in the form of rules. These systems have been applied to interpretation of sensor data, operational fault diagnosis, process disturbance handling, prediction of consequences of changes, and process optimization during plant operation, start-up, and shutdown. The following U.S. and foreign patents provide examples of such systems.

| Kemper et al. | U.S. Pat. No. | 4,644,479 |
| Hardy et al. | U.S. Pat. No. | 4,648,044 |
| Thompson et al. | U.S. Pat. No. | 4,649,515 |
| Clemenson | U.S. Pat. No. | 4,675,829 |
| Gallant | U.S. Pat. No. | 4,730,259 |
| Natarajan et al. | U.S. Pat. No. | 4,752,890 |
| Ashford et al. | U.S. Pat. No. | 4,754,409 |
| Heichler | U.S. Pat. No. | 4,757,506 |
| Ashford et al. | U.S. Pat. No. | 4,763,277 |
| | EPO | 184,087 |
| | EPO | 184,088 |
| | EPO | 205,873 |
| | PCT/WO87 | 6,371 |
| | DE | 3,621,859 |
| | JP 63 | 209,917 |

The Kemper patent discloses apparatus including a set of sensors, which can be distributed about an industrial plant, for providing data to a computer. The computer utilizes an expert system which reads and processes the output of the sensors to obtain indications of sensor output change, confirmation of sensor readings, and malfunction indications based on sensor readings.

The Hardy et al. patent discloses an expert system for constructing a knowledge base utilizing facts, rules, and meta-facts which control the application of rules to solve specific problems.

Thompson et al. discloses apparatus for fault diagnosis and control, including elements for generating a knowledge base for the controlled process and storing the knowledge base in memory as a list including domain specific rules in evidence-hypothesis form.

Ashford et al. '409 discloses a method for collecting data from external processes and applying the data for use in an expert system. The expert system rulebase includes specific definitions of processes which are available to the expert system. The method permits data to be collected in response to location, time, and other attribute parameters supplied by the expert system.

Ashford et al. discloses an expert system which generates answers to system-generated inquiries based on related information previously obtained or generated by the system. The system utilizes action attributes that can be attached to rule tree nodes which provide an answer to a class inquiry, based on processing selected dependent nodes.

Natarajan et al. discloses an expert system including a sub-system for optimizing the scanning of rule lists in programs containing a sequential decision chain with independent or mutually exclusive outcomes. The sub-system executes iterative observations of the execution of the decision chain to optimize the ordering of rule application.

The PCT/WO87/06371 publication discloses an expert system for processing data to produce signals indicative of the condition of a monitored process. The expert system provides an adaptive pattern recognition utility which can be trained to recognize combinations of input data representative of particular fault conditions.

The JP 209917 publication discloses an expert system for controlling industrial processes. The system includes input means for reading fault data, a knowledge base for storing fault data and causation data for selected sub-processes, a set of diagnosticrule data representative of confidence levels for diagnostic results obtained by applying the diagnostic rule data, and a rule driven engine for calculating the effects of decisions rendered for selected fault events, based on the knowledge base.

The DE 3,621,859 publication discloses an expert system in which each problem solution is stored as a value representative of the sum of problem oriented criteria, under the control of a value code.

Clemenson, Gallant, Heichler, EPO 184,087, EPO 184,088, and EPO 205,873 also disclose rule-based decision systems.

Another process control system is disclosed in Moore, "Expert Systems in Process Control", *TAPPI Proceedings*, 1986. The Moore publication discusses time stamping of measured or inferred values, and assignment of currency intervals to variables.

Certain conventional process control systems, however, are unable to provide real-time processing of the large numbers of measurements generated by distributed control systems. These systems thus can not provide advisory information to an operator in real-time. Some prior art control systems are limited by conventional expert system configurations, which exhaustively search rule bases and fire all rules, thereby expending significant processing time. This problem is especially apparent in applications requiring large knowledge bases for accurate implementation.

It is accordingly an object of the invention to provide methods and apparatus for real-time monitoring, information, advice, control and optimization of plant processes, utilizing streamlinedrule processing.

Existing distributed sensor systems provide only a limited bandwidth channel between the distributed sensors and the processor. It is therefore undesirable to have unnecessary data transmitted into the system. Notwithstanding this limitation, however, conventional control systems, typically sample all distributed process sensors on a regular basis. This scanning leads to saturation of the available communications bandwidth with measurement values and alarms, and causes overloading of the distributed process sensor system with requests for information. Communications channel overload is especially troublesome because data quickly becomes invalid under overload conditions. While it is desirable to have data available and current when a given rule requiring the data needs to be evaluated—rather than to request data on a piecemeal basis as required by a given rule—many conventional control systems do not optimize data requests in this manner.

It is therefore another object of the invention to provide real-time methods and apparatus which optimize data requests and utilization of communications channel bandwidth.

A further object of the invention is to provide real-time control methods and apparatus which can integrate into existing plant control systems. Information from databases, MIS systems, supervisory systems and simulators may be required for analysis, in addition to data and alarm information from existing plant control systems.

Still another object of the invention is to provide real-time control methods and apparatus which can be event driven—i.e., in addition to requesting data, the system responds to interrupts by alarms and process events. A further object is to provide methods and apparatus in which the control process is not interrupted by secondary processes such as data plotting or system maintenance.

An optimal real-time process control system should provide flexibility in data and message presentation, so that users can configure operator interfaces for message and data presentation in accordance with their current control strategy and operator expertise. The control system should be capable of transmitting advisories back to the existing local control system for use in an operator's message page or application window.

Additionally, the control system should operate on an industry accepted, commonly available, general purpose computer system, should utilize software coded in an industry accepted language, but should not require programmers for operation or specification, or knowledge engineers for development. Certain process control expert systems fail to provide a user/knowledge base interface which facilitates programming and knowledge base restructuring by on-site personnel. It is thus another object to provide real-time methods and apparatus with enhanced user- and external-interface capabilities and characteristics.

Further objects of the invention are to provide real-time control methods and apparatus which can operate during all states of a process from start-up to shut-down; recognize and appropriately process data of uncertain, missing or diminished validity; self-recover after a power interruption without data loss and maintain continuous operation even when a fault occurs; compare a process with a simulator model of the process while on-line; and permit the imposition of access security restrictions.

Other general and specific objects of the invention will in part be obvious and will in part appear hereinafter.

SUMMARY OF THE INVENTION

The foregoing objects are attained by the invention, which provides digital processing methods and apparatus for monitoring, controlling, and simulating industrial processes, including processing a set of data signals representative of periodically sensed process parameter values and responding to the data signals in real-time to generate response values representative of requested process parameter values. In one aspect of the invention, a knowledge base, including a rule-base module, stores and provides knowledge relating to the industrial process, to enable a real-time processor to operate upon the data signals in accordance with stored knowledge. An inference engine in the processor calculates intermediate data values in response to the data signals and the rules, and calculates the response values in real-time, based on a combination of the data signals, intermediate data values, and rules. The inference engine includes an expression evaluator for evaluating logical expressions representative of data signals, intermediate data values, and rules. Each logical expression can include a set of variables corresponding to the data signals.

In accordance with the invention, time-stamp elements determine and assign a time-stamp value to each data signal. Time-stamp values represent the time at which each process parameter value is generated. A currency evaluator—also referred to herein as a scheduler—reads the time-stamp signals and user-selected currency range values. The currency evaluator assigns an expiration-time value to each data signal, intermediate data value, and variable, and discards data signals having an expiration-time value outside a corresponding user-selected currency range value. The currency evaluator can assign expiration-time values to the variables in accordance with a selected logical function of the variables in a given expression. For example, expiration-time values can be assigned based on the lowest expiration-time value in the expression.

Sensors periodically sample process parameter values and provide data signals representative of these values. Control signal generating elements coupled to the processor then generate control signals in response to the calculated response values. Control elements respond to the control signals by controlling the industrial process to attain the requested process parameter values. The inference engine of the invention can include primary rule processing elements for processing a first set of rules representative of a first set of knowledge relating to the industrial process, and secondary rule processing elements for processing a second set of rules representative of a second set of knowledge. Moreover, the inference engine can include elements for executing forward and backward chaining of the rules in accordance with the data signals. The invention can include alarm elements for calculating a set of alarm threshold values and generating alarm signals when a sensed process parameter value exceeds a corresponding alarm threshold value. A monitor or console linked to the processor can display the data signals, calculated response values, requested process parameter values, or alarm signals.

A further aspect of the invention provides a simulator for modeling the industrial process in response to user-selected process parameter values and in accordance with stored knowledge; and elements for enabling recovery without data loss in the event of power failure or process interruption. The invention can also include elements responsive to the currency evaluator for requesting data from the sensors only when a data signal previously generated in correspondence with a given sensor has an expiration-time value outside a corresponding user-selected currency range value.

The invention will next be described in connection with certain illustrated embodiments; however, it should be clear to those skilled in the art that various modifications, additions and subtractions can be made without departing from the spirit or scope of the claims.

BRIEF DESCRIPTION OF THE DRAWINGS

For a fuller understanding of the nature and objects of the invention, reference should be made to the following detailed description and the accompanying drawings, in which:

FIG. 14 depicts a queue established by the RTAC scheduler;

FIG. 15 depicts reconfiguration of the queue by the RTAC scheduler;

DESCRIPTION OF ILLUSTRATED EMBODIMENTS

Figure 1:
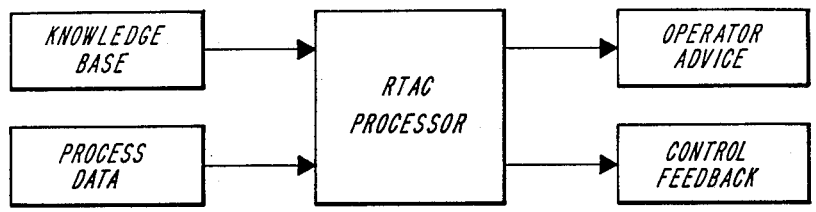
FIGS. 1 and 2 depict data inputs to, and advice and control outputs from, a real-time advisory control (RTAC) processor constructed in accordance with the invention.

FIG. 1 depicts a real-time advisory control (RTAC) processor constructed in accordance with the invention. The RTAC processor shown in FIG. 1 monitors and controls multiple process tasks in an industrial process, to optimize the process, predict the effects of changes, and advise the operator. As FIG. 1 illustrates, the RTAC processor receives process data and signals representative of process events. The processor applies knowledge about the process to advise operators and provide control system feedback, typically in the form of setpoints, in a manner discussed in greater detail hereinafter. The process knowledge can be entered into the RTAC processor in the form of rules. Typical rules can identify trends or represent a set of appropriate actions to execute when a particular problem or alarm is identified. Other rules can assist in confirming the validity or invalidity of sensor readings, management of state changes, or process optimization.

Figure 2:
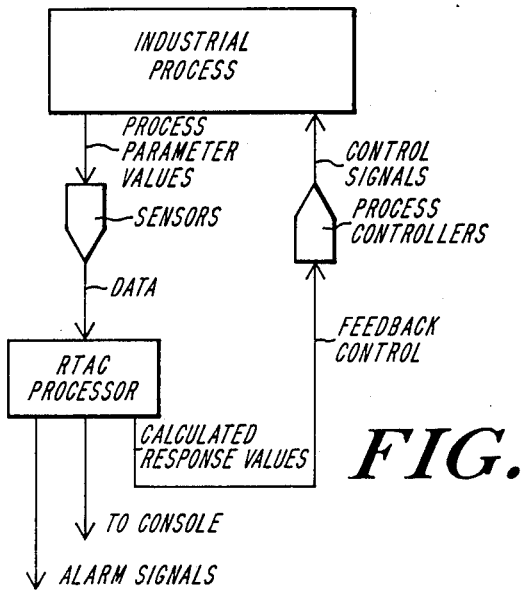

In particular, as depicted in FIG. 2, the processor receives data signals from process sensors which periodically monitor operating values representative of the process. The processor then evaluates the data signals, in a manner discussed in greater detail hereinafter, to generate response values, alarm signals, and display driving signals. The processor can assert response values to a feedback control system which modifies process values in real-time. The processor can also predict the outcome of the process, or the effect of changes, and provide this predictive information to the operator data in real-time.

The RTAC processor can include, for example, a conventional mainframe or mini-computer, such as a Digital Equipment Corporation VAX computer. Those skilled in the art will appreciate that the invention can be practiced in connection with other digital or analog processing circuits, devices, or processors, including microprocessors and multiprocessor digital computers.

Figure 3:
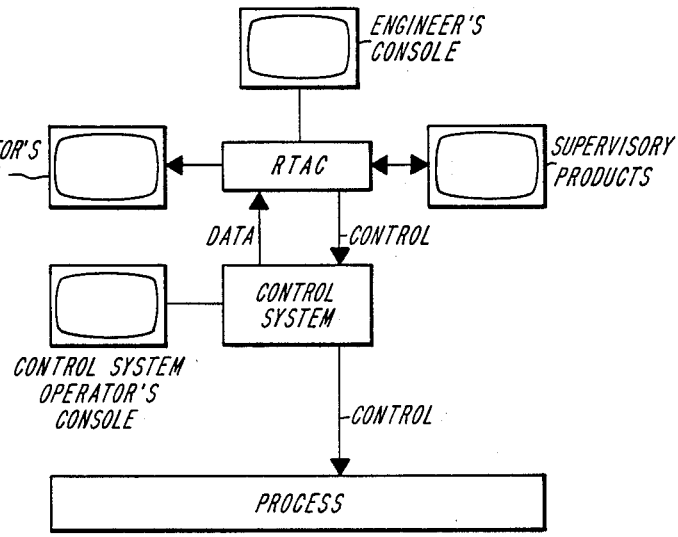
FIGS. 3 and 4 depict interconnections between an industrial process, conventional control systems, and the RTAC processor of FIGS. 1 and 2.
Figure 4:
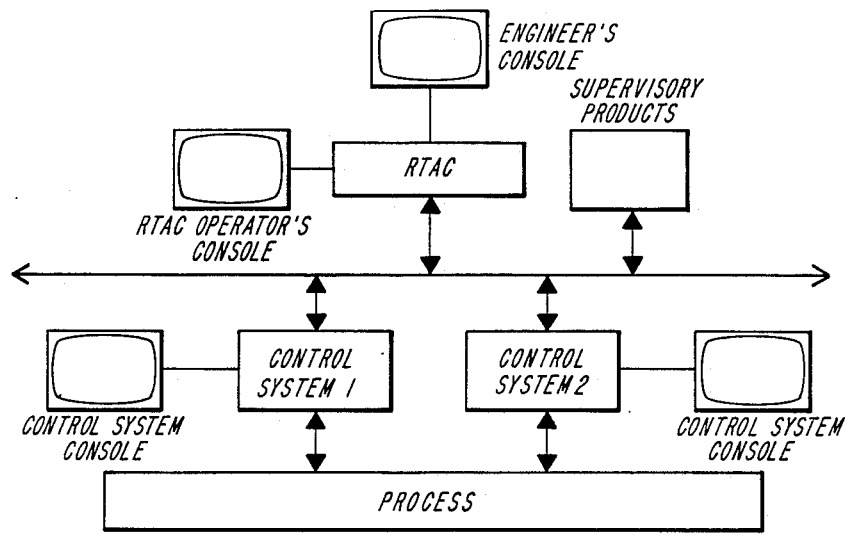

Referring now to FIGS. 3 and 4, the RTAC processor can be linked to existing local control systems, supervisory products, and major process equipment in an industrial plant, for sending and receiving data, control signals, and messages, and to provide operator advisories to be sent to multiple control system consoles. The existing local control level can include multiple process parameter sensors, programmable logic controllers (PLC) and distributed control systems (DCS). Sensor data is transmitted by the sensors, and can be stored in a database or distributed onto a data bus. In most cases, a large number of sensor values are generated by one or more distributed control systems monitoring the industrial process. Information from databases, simulators, and plant supervisory control systems can also be accessed for process diagnosis. The RTAC processor employs these interconnections to provide operators with on-line advisory control capability for managing complex processes.

In one practice of the invention, the RTAC processor can communicate with existing control systems via conventional communications channels, such as those exemplified by the RS-232 protocol, ETHERNET, or Digital Equipment Corporation DECNET. The communications channel can include electrical and optical elements, and can incorporate a modem for remote communications with the RTAC processor.

As shown in FIG. 4, the RTAC processor can be linked to multiple control systems via data buses or local area networks. A comprehensive advisory control system constructed in accordance with the invention can include multiple external systems. Alarms can be broadcast from a data bus, a database can store data for comparison to process data, and a local area network can be employed to request plant data and return advice messages to specific operator stations. Because the RTAC processor can utilize information from multiple data sources in a plant, information from supervisory systems, databases, simulators and customer developed programs can supplement DCS data for diagnosing problems, managing state changes, and process optimization.

Figure 5:
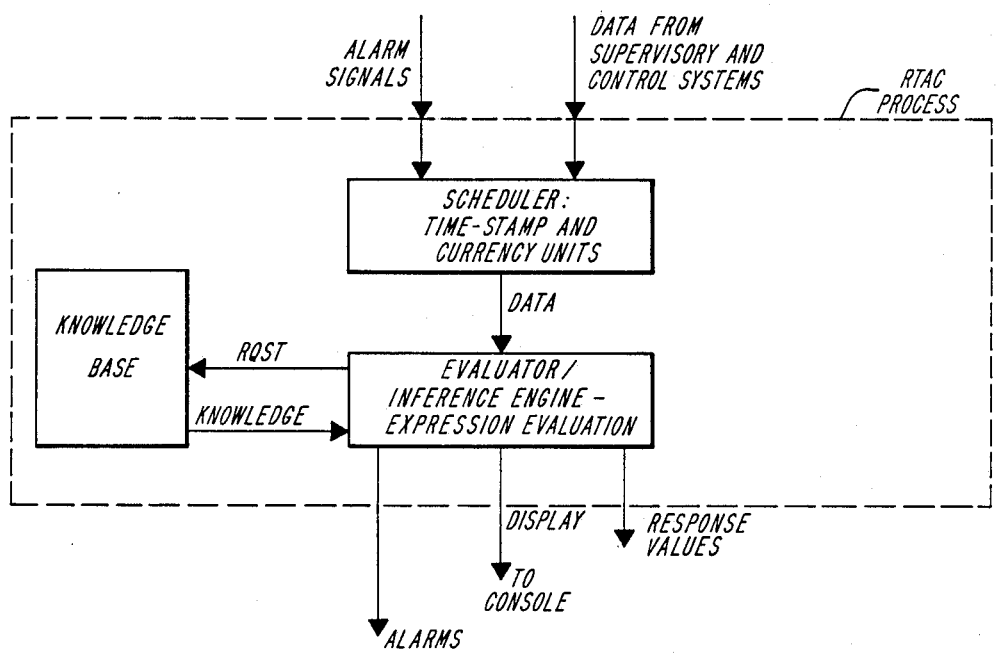
FIGS. 5 and 6 are block diagrams showing detail of an embodiment of the RTAC processor.
Figure 6:
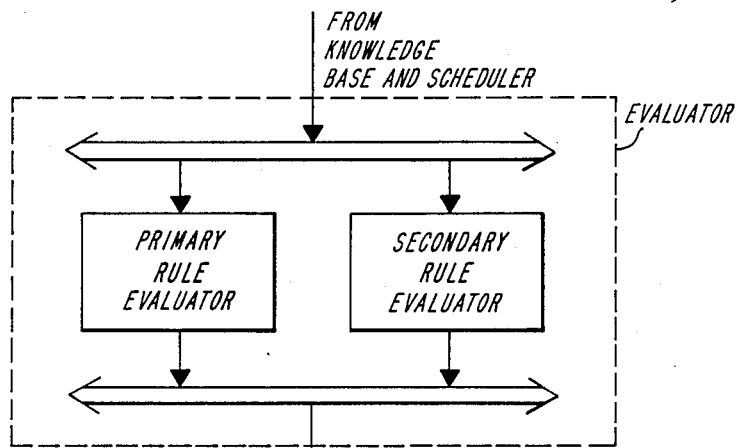

Detail of the RTAC processor is depicted in FIGS. 5 and 6. The RTAC processor includes a scheduler module for processing scheduling, time-stamping, currency and expiration evaluation, a knowledge base element for storing knowledge in the form of primary and secondary rules, and an evaluator for providing inferencing based on primary and secondary rules, as explained in further detail below. The RTAC processor partially event-driven—i.e., rules stored in the knowledge base can be fired as scheduled rules or as event-driven rules. In processing scheduled rules—also referred to herein as primary rules—the RTAC processor normally requests process data and calculated variables from the control system and the supervisory systems in a manner discussed hereinafter. For event-driven rules, alarms, trends, conditions, or other rules cause execution. Thus, unsolicited data, such as alarms, can also interrupt the RTAC system for analysis, advice and control system feedback.

Figure 7:
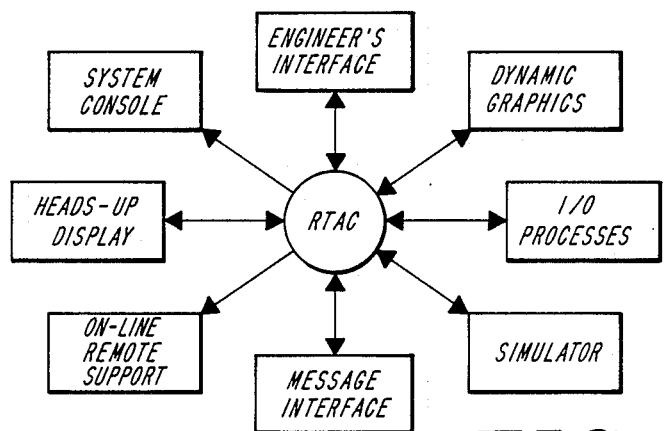
FIG. 7 is a block diagram depicting an RTAC system structured, in accordance with the invention, around the RTAC processor.

In a further preferred practice of the invention, depicted in FIG. 7, an RTAC system is structured in a modular form around an RTAC processor. The RTAC processor is the hub of the RTAC system illustrated in FIG. 7, providing centralized coordination of satellite modules and programs, in addition to inferencing and scheduling processes discussed in greater detail hereinafter. The RTAC system can include a developer's interface, dynamic graphics module, I/O process module, simulator, message interface unit, heads-up display, and a system display monitor.

The function of the developer's interface indicated in FIG. 7 is to manage the creation, editing, running, debugging, and auditing of a set of program objects, including sensor values and rules, that are collectively referred to as a knowledge base. The developer's interface preferably contains the development hardware and software required for entering sensor and rule information, as explained below.

Figure 8:
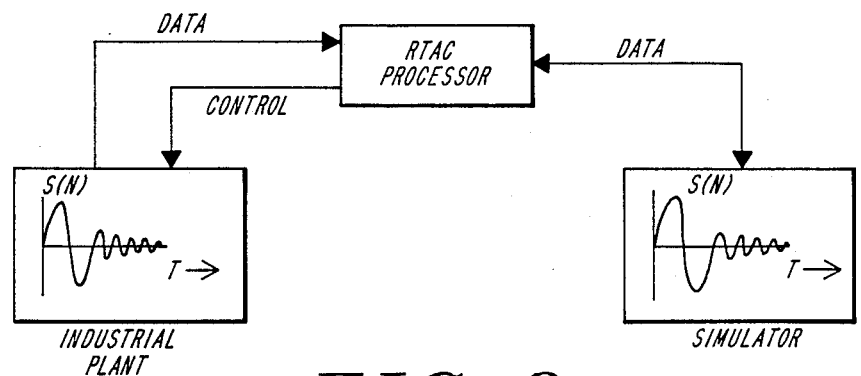
FIG. 8 is a block diagram showing communication of the RTAC processor, simulator, and distributed sensing system of an industrial plant.

The real-time simulator module of FIG. 7 permits rule logic to be tested off-line, as illustrated in FIG. 8. The simulator indicated in FIGS. 7 and 8 includes elements for simulating sensor values in a manner described in greater detail hereinafter, and for applying these simulated values to test rule execution against known input conditions. The RTAC system simulator compares sensor values generated by an actual plant with those generated by the simulated plant. The simulator feature of the invention can be implemented in connection with conventional VMS mailbox applications, which provide modeling capability for testing and exercising a knowledge base, for providing stand-alone demonstrator capability. The RTAC simulator thus provides modeling of the plant process, and validation of knowledge and structure in an off-line environment, running in parallel with external control systems.

When the RTAC system is running, the I/O process module generates a separate I/O process for each external system to which data are transmitted, or from which information is received. The RTAC system can be controlled by a keyboard, or can utilize a known menu command protocol, in which menu items are selected by a user-controlled pointing device such as a mouse.

The message interface and dynamic graphics modules depicted in FIG. 7 can include message and graphics software, respectively, for enabling flexible presentation of messages and information. The message processor allows users to automatically back-trace a message through a logic diagram back to sensor data. The dynamic graphics module can also automatically generate plots of sensor data and calculated variables, thereby simplifying verification of rules and logic. The graphics module can include color graphics software configurable by the user. Messages, plots, and diagrams of plant processes can be displayed. The RTAC graphics module preferably can generate predefined graphics under the control of selected rules, or when the user selects a message from the message interface. In many cases, the advisory messages can be sent directly to applications windows or universal stations within a control system. The RTAC system can thus be configured to complement the user's selected control and advisory strategy.

Figure 9:
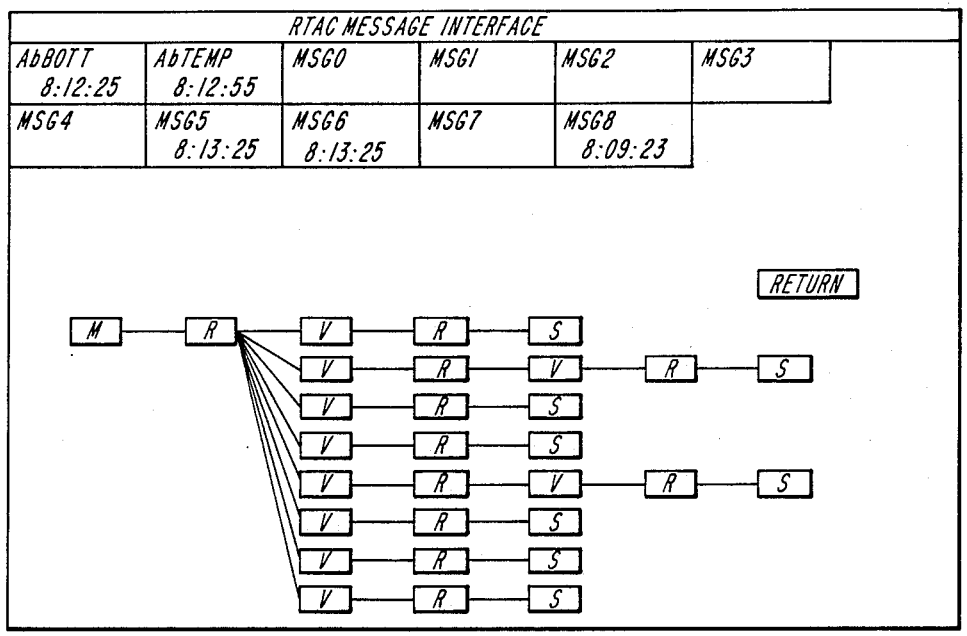
FIG. 9 depicts an explanation tree generated in accordance with the invention.

One function of the message interface and graphics modules is illustrated in FIG. 9, which depicts an explanation tree generated and displayed by the RTAC system. The explanation tree indicates the logical paths which led to the specified message or rule. This tree is conclusion oriented, and is read from left to right. Thus, the final conclusion is the object on the left, while the initial data are displayed at the right of the explanation tree.

Figure 10:
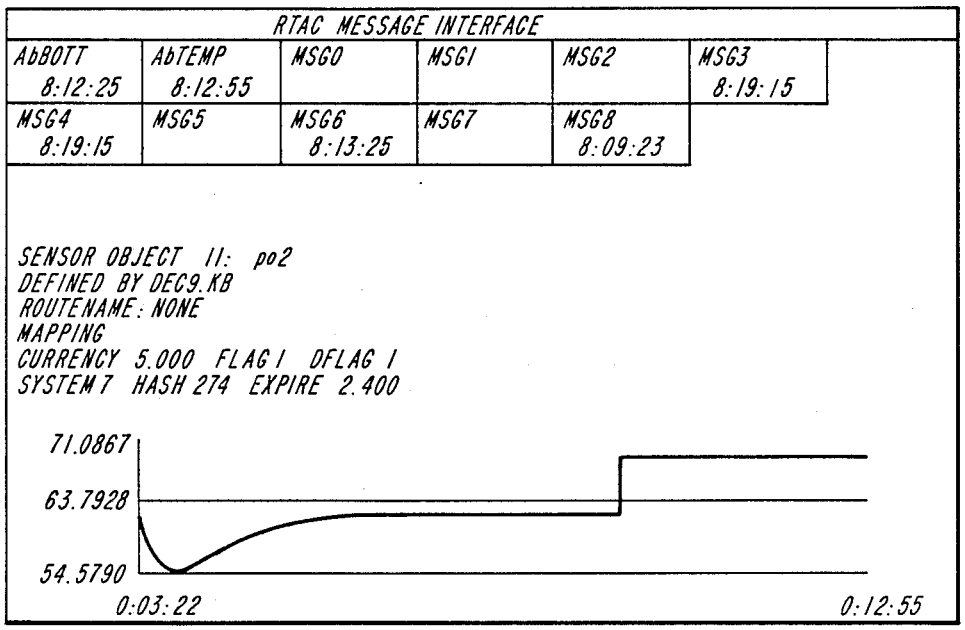
FIG. 10 depicts a graphical representation of historical sensor values.

The history of a sensor object value can also be displayed, as illustrated in FIG. 10. This state displays a graphical representation of the data in the specified objects database. The representation in FIG. 10 is a conventional data plot, in which data values correspond with the vertical axis and time values correspond with the horizontal axis. The oldest time and minimum data value are represented at the origin. The most recent time value is indicated on the right, and the maximum data value is on the left. In addition to this information, an average data value can be displayed in the form of a horizontal line.

Referring again to FIG. 7, the system console depicted therein provides performance information with respect to system load and communications with the external systems. The heads-up display or watch window module of FIG. 7 permits engineers to view a user-configurable table of current sensor and variable values.

As discussed above, the function of the RTAC system shown in FIG. 7 is controlled by the RTAC processor of FIG. 5, based in part on the RTAC knowledge base. The knowledge base is composed of data structures referred to herein as objects. In accordance with the invention, these objects can be defined and manipulated in connection with the RTAC language, as set forth in Appendix A attached hereto. The RTAC objects include, but are not limited to, SENSORS, RULES, VARIABLES, and DEVICES.

A SENSOR is an input available from an outside source. It represents the input link for the flow of data between the processor and the external environment. The invention can be implemented as a frame-based system in which a SENSOR object is defined to have the attributes depicted in FIG. 11.

The most significant attribute of a SENSOR is its currency interval. This is the time period during which computations on the most recently received SENSOR values are permitted. A time indexed data history of these SENSOR values can be maintained for use in rate and extreme calculations, and can be displayed as discussed above in connection with FIG. 10. A data history is a set of <time, value> pairs.

The RTAC system scheduler depicted in FIG. 5 can automatically schedule requests for SENSOR values and perform rule executions in response to rule scheduling requirements and the latency of data request servicing. These scheduling processes are addressed below in connection with FIGS. 21-23.

A SENSOR can be defined by the expression define_sensor X
    currency=Y;
    system=Z;
    simulation=expression;
    simulation_initial_value=0;
    route=false;

which establishes a process value SENSOR named X. Specification of the currency interval. The interval can, for example, default to 10 seconds.

The RULES represent the knowledge applied by the RTAC processor in the solution of a problem. An example of the attributes of a RULE is provided in FIG. 12. In accordance with the invention, the RTAC processor establishes three categories of RULES. The first category is composed of RULES with predetermined scan intervals. These RULES are fired at regular intervals, and are referred to as primary RULES. The second type is composed of RULES that produce a result required by other RULES. These are known as backward-chained RULES. The third type is composed of RULES which are fired by other rules using a forward-chaining construct referred to herein as the CONCLUDE mechanism, as set forth in Appendix A attached hereto. These rules are referred to as forward-chained or secondary RULES.

Generic RULES can be employed to expedite the creation of a knowledge base, and to generate macros—i.e., abbreviated representations of oft-invoked procedures. One application of generic RULES is in defining formula translations resembling FORTRAN in-line functions. Another area of application is in defining generic RULES that operate on objects not explicitly defined. In this application, an implicit search for specified attributes of selected objects is executed to identify the applicable SENSORS, DEVICES, and VARIABLES to which the generic RULES apply.

In accordance with the invention, a RULE can be defined by the expression define$_{13}$ rule R
    expression;
    scan=Y Specification of the scan interval is optional. If a RULE has a scan interval Y, then it is scheduled to be run every Y seconds, as long as all SENSORS and VARIABLES contained in its expression are valid. In particular, all lexically apparent data in an expression must be valid.

If R cannot be run in the specified scan time Y, then it is placed onto an interrupt driven queue of operations to execute when new values for its required inputs arrive. This is described in greater detail hereinafter in connection with FIGS. 13-16.

A RULE without a scan interval has its expression evaluated if and only if it sets VARIABLES used by other RULES or if it references VARIABLES which are set inside the CONCLUDE construct. The former condition is referred to herein as a call by backward chaining, while the latter is a definition of forward chaining.

VARIABLES are objects which store the intermediate results of computations. A significant attribute of a VARIABLE is its currency interval, and the effect this interval will have on system behavior and performance. In general, the shorter the currency intervals assigned to internal VARIABLES, the more work is expended in rule execution to keep the referenced VARIABLES valid. The following is an example of code utilized in connection with the invention to define a VARIABLE:

---
define_variable X
    Optional_formula;
    currency = S;               initial_value = v;
---

This defines a VARIABLE named X. In accordance with the invention, VARIABLES have a current value, expiration date, and a data history. As discussed above in connection with SENSORS, a data history is a set of <time,value> pairs. VARIABLES may be referenced in a RULE. VARIABLE may be set by RULES or have an associated formula. The scan field is also optional. When specified, the scan value ensures that the value of the VARIABLE is recalculated at least as often as the scan time S—otherwise, the value is calculated by backward chaining as required.

Other objects can be defined in accordance with the invention. A DEVICE is an object whose meaning can be user-specified, by assigning selected SLOT names to various DEVICES. SLOTS are constructs which can behave as variables or constants, depending upon context, and which can be utilized in RULES, generic RULES, and simulation statements. Any DEVICE can have SLOTS defined by the user, using the following format:

---
define_device name
    any_expression;
    any_expression;
    any_expression,
---

In a RULE or VARIABLE formula expression the slotname of a DEVICE can be utilized in place of a VARIABLE such as slotname$_{13}$ of_device. An example is as follows:

---
define_sensor sl
    currency = 10 seconds;
    simulation = 100*(t*2*PI/1 minute);
    max_alarm_level = 80;
    define_rule sl_max_check
        if sl > max_alarm_level of sl then
            send(engineer,"Sl is too high at ",sl);
    scan = 5 seconds;
---

If a SLOT has a constant value and is not assigned then it is treated as a constant. If a SLOT is assigned in a RULE, then it is treated as if it were a VARIABLE without a formula, and with an initial value as specified on the right hand side of the SLOT definition—unless that field is no_formula, in which case the VARIABLE has no initial value. In other cases, a SLOT is treated as a VARIABLE with a formula, using the right hand side of the SLOT definition.

SLOTS can be assigned many attributes in addition to a formula. These attributes are specified on the right hand side of the equals sign, and are separated by a comma. For example, an example of a SLOT S1 with no_formula and an initial value of 10 with the string_print option is as follows:

```
define_device X
    S1 = no_formula,initial_value = 10,
    string_print;
```

The value to the right of the equals sign is treated as if it were given a statement inside a define_variable definition.

The RTAC language supports the definition of generic objects, which are useful in a variety of applications. The simplest use of generic objects is to define an abbreviation for an often-used expression, as in the following example:

```
define_generic setpoint_macro
    form = setpoint(S1,value);
    translation = if dt(S1) >= min_change_ period
of S1
    then S1 := value;
```

As a result of this code, when an expression matching the specified form is found in a RULE or VARIABLE formula, the expression is replaced by the translation. The following RULE could therefore be expressed as either

```
define_rule adjust_level
    if level > 10 then
        if dt(level_control) >=
        min_change_period_of_level_control
            then level_control := -1;
``` or equivalently as

```
define_rule adjust_level
    if level > 10 then
        setpoint(level_control,-1);
```

A general RULE is a RULE that can apply to any object or set of objects which satisfy a selected constraint. The most common type of constraint is the presence of certain SLOTS in an object, as follows:

```
define_generic max_alarm
    constraint = S has max_alarm_level;
    rule =
    if S > max_alarm_level of S
        then send (engineer,"S"," at ",S," is over
        max alarm level.");
```

This would define a RULE to handle every OBJECT which had a max_alarm_level SLOT. If only objects which are SENSORS are required then the constraint can employ the ISA construct:

```
constraint    =    (S is a sensor and S has
                    max_alarm_level);
```

Constraints may specify more than one object and also deal with connections between objects.

In a preferred embodiment of the invention, a rule, with or without a scan interval, can be assigned a CATEGORY SLOT, as follows:

```
define_rule r2
    send(engineer,"category B must be
        active");
    scan = 3 seconds;
    category = B;
```

If a rule has a CATEGORY SLOT then its body will not be run unless the CATEGORY to which it belongs is active. CATEGORIES are useful in rendering the knowledge base more modular and manageable. Processing modes implemented with CATEGORIES could also be implemented by the use of an explicit controlling VARIABLE, together with RULES that use set_slot_internal to manage the scan intervals of RULES in a particular category, as follows:

```
active_category(B) and
```

The effect of the activate category operation is to schedule all RULES in the CATEGORY that have scan intervals, and to enable all other RULES in the CATEGORY to be evaluated when needed by forward or backward chaining. The expression

```
deactivate_category(B) and
``` disables all RULES in CATEGORY B.

In accordance with the invention, symbolic expressions can have a conventional tree structure. Expressions are evaluated for both value and effect. The value of an expression is assigned an expiration date which is recursively defined, based on the currency intervals of its terminal SENSORS and VARIABLES. Unlike certain conventional process control expert systems, the invention does not divide rules into IF and THEN segments for evaluation. Instead, the RULES are treated as expressions which are evaluated only if all preceding data is available and current.

Expressions can include object operations, as in the following example:

```
rate(X,time_interval,min_points) is
    (X[t] -X[t-time_interval])/time_interval.
change(X,time_interval,min_points) is
    (X[t] - X[t-time_interval])
ave(X,time_interval,min_points) is
    the sum of X[t[j]] for j over N points in
    the previous time_interval, divided by the
    number of sample points.
dt(X) where X is a sensor or a variable returns
    the time since the last data point of X
if problem(sensor) = 3 then . . .
```

The PROBLEM operator takes a SENSOR or SETPOINT as its argument and returns a number describing the current problem with that object. A value of 0 is returned if there are no problems. Problem codes are dependent on the external system involved, the default being:

```
0 no problem
1 user-defined
```

-continued 2 user-defined
...
last_value(V), where V can be a SENSOR or VARIABLE having a history. The following expression returns the most recent value of the object:

nth_previous_value(V,n)

where V can be a sensor or variable having a history, and n is an integer. If n=0 then this expression has the same effect as the last_value operator. Therefore, to compute a three point average of a sensor X, the following expression can be utilized:

(X + last(X) + nth_previous_value(X,1))/3
get_slot_internal(obj_name,slot_name)

The slot_name is currency, expiration, or scan, and the obj_name may be a sensor, variable, or rule, as follows:

set_slot_internal(obj_name,slot_name,value)

Figures 11, 12, 13:
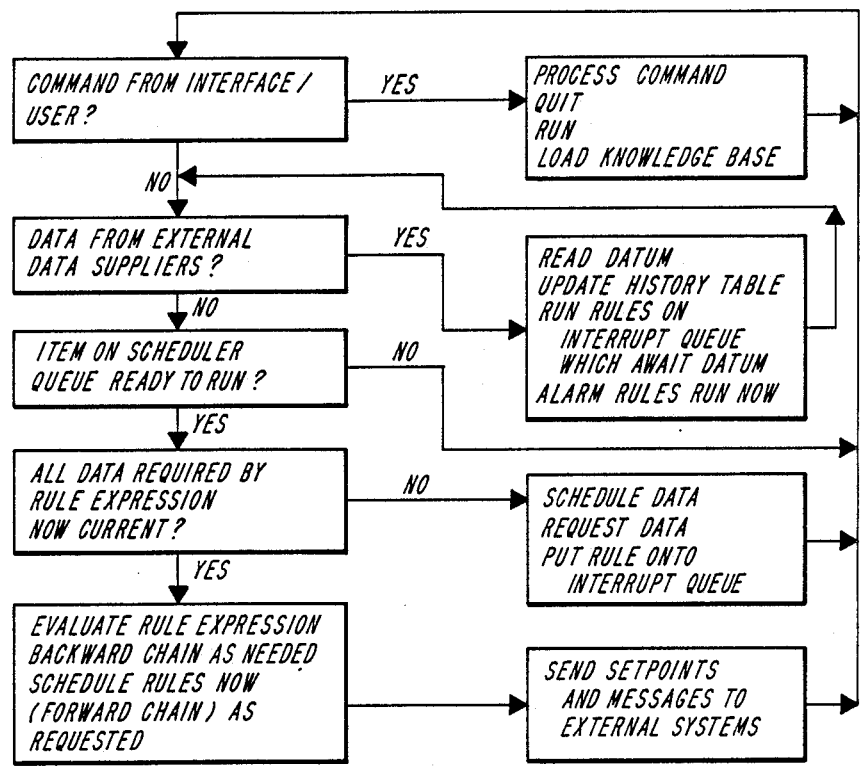
FIG. 11 depicts a SENSOR object defined in accordance with the invention.
FIG. 12 depicts a knowledge base RULE object defined in accordance with the invention.
FIG. 13 is a flow chart of inference engine operation in the RTAC processor.

The above-described objects are processed in the inference engine of the RTAC processor (FIG. 5) to provide real-time advisory control functions. The inference engine processes of the invention are illustrated by the flowchart of FIG. 13. As indicated therein, and discussed below in connection with FIGS. 14–16, RULES and requests for data can be scheduled on a queue. Execution of the process depicted in FIG. 13 causes a data request to be transmitted to the external data suppliers. These data suppliers are further utilized in connection with the alarm function indicated in the input processing sections of FIG. 13—execution of the alarm function causes a data request to be transmitted to the external data suppliers.

Figure 17:
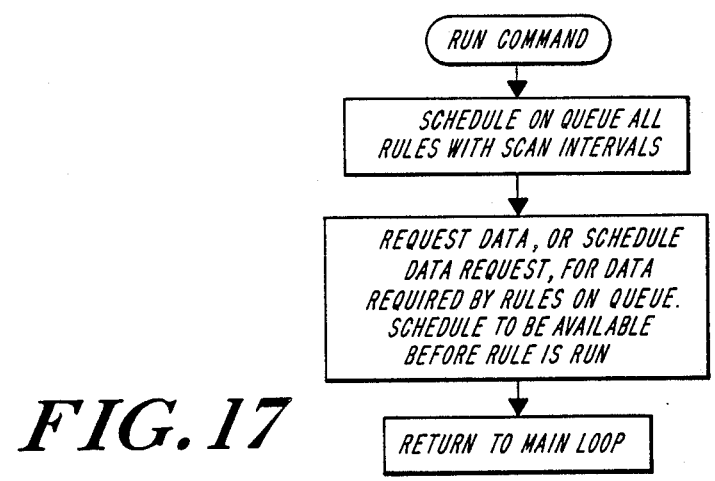
FIG. 17 is a flow chart of the RUN command in the inference engine.
Figure 18:
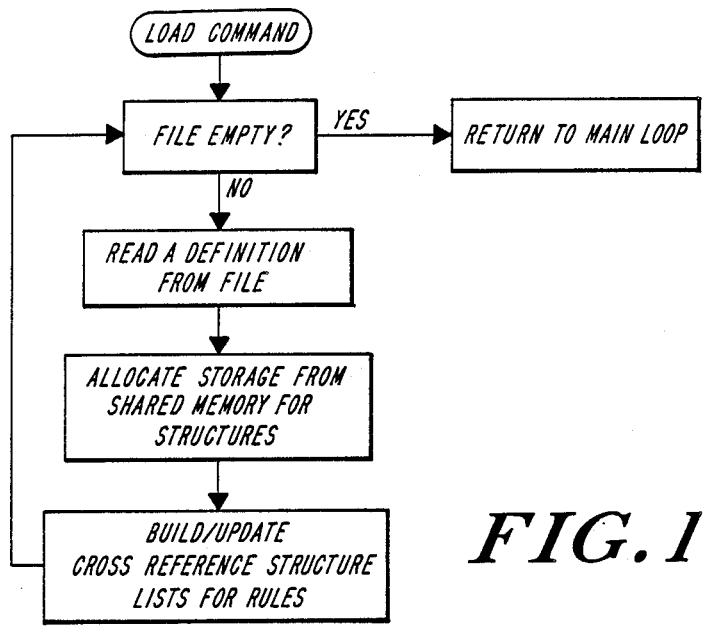
FIG. 18 is a flow chart of the LOAD command in the inference engine.

The backward chaining indicated in FIG. 13 enables processing of all variables requested by a given variable and necessary to determine the state of the given variable. This state-determination generates a tree of backward references to be processed. Moreover, a given variable can activate other variables upon entering selected states, so that forward chaining occurs. Among the inference engine commands indicated in FIG. 13 are the RUN and LOAD commands. Flowcharts for these commands are depicted in FIGS. 17 and 18, respectively. The illustrated allocation step of the LOAD command can be implemented with conventional parsing techniques.

Figure 19:
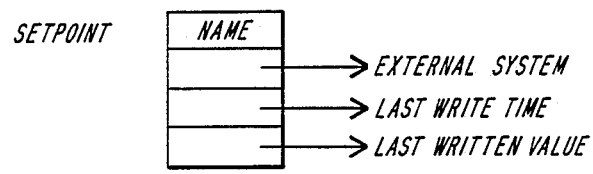
FIG. 19 depicts the SETPOINT data structure defined in accordance with the RTAC process.
Figure 20:
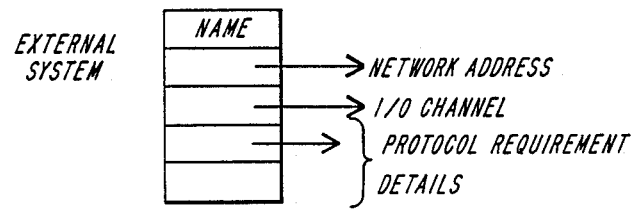
FIG. 20 shows the EXTERNAL SYSTEM data structure defined in accordance with the RTAC process.

The process represented in the flowchart of FIG. 13 is preferably executed in connection with the data structures depicted in FIGS. 19-23. FIGS. 19 and 20 show SETPOINT and EXTERNAL SYSTEM data structures, respectively. The EXTERNAL SYSTEM data structures are employed for sensor access, under the control of the currency evaluator discussed below, for requesting data from the sensor elements at selected intervals defined by the scheduler.

Figure 21:
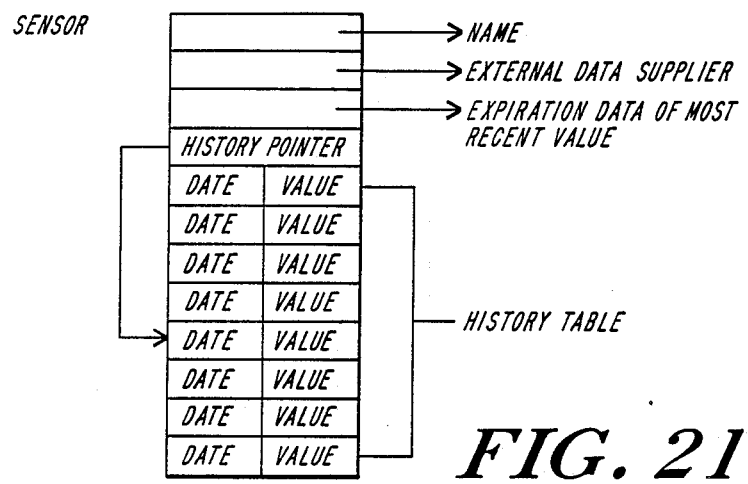
FIG. 21 depicts the SENSOR data structure defined in accordance with the RTAC process.
Figure 22:
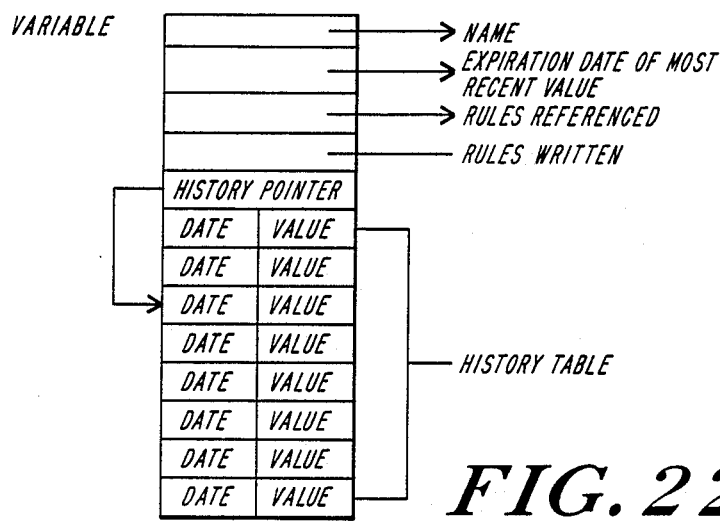
FIG. 22 illustrates the VARIABLE data structure defined in accordance with the RTAC process.
Figure 23:
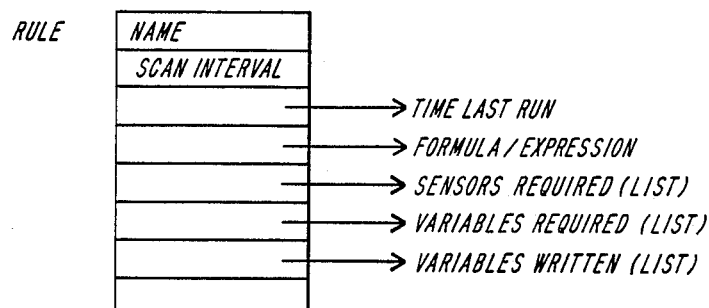
FIG. 23 shows the RULE data structure defined in accordance with the RTAC process.

FIGS. 21, 22 and 23 depict data structures for SENSORS, RULES, and VARIABLES, respectively. As indicated therein, these data structures include slots for storing expiration values. Additionally, the DATE and VALUE entries in the SENSOR and VARIABLE data structures form a history table with associated history pointer, which can be implemented in a conventional ring buffer containing time-stamped values generated in accordance with the invention. The VARIABLE data structure resembles the SENSOR data structure, but contains slots for RULES REFERENCED and RULES WRITTEN, in place of EXTERNAL DATA SUPPLIER.

Figures 14, 15:
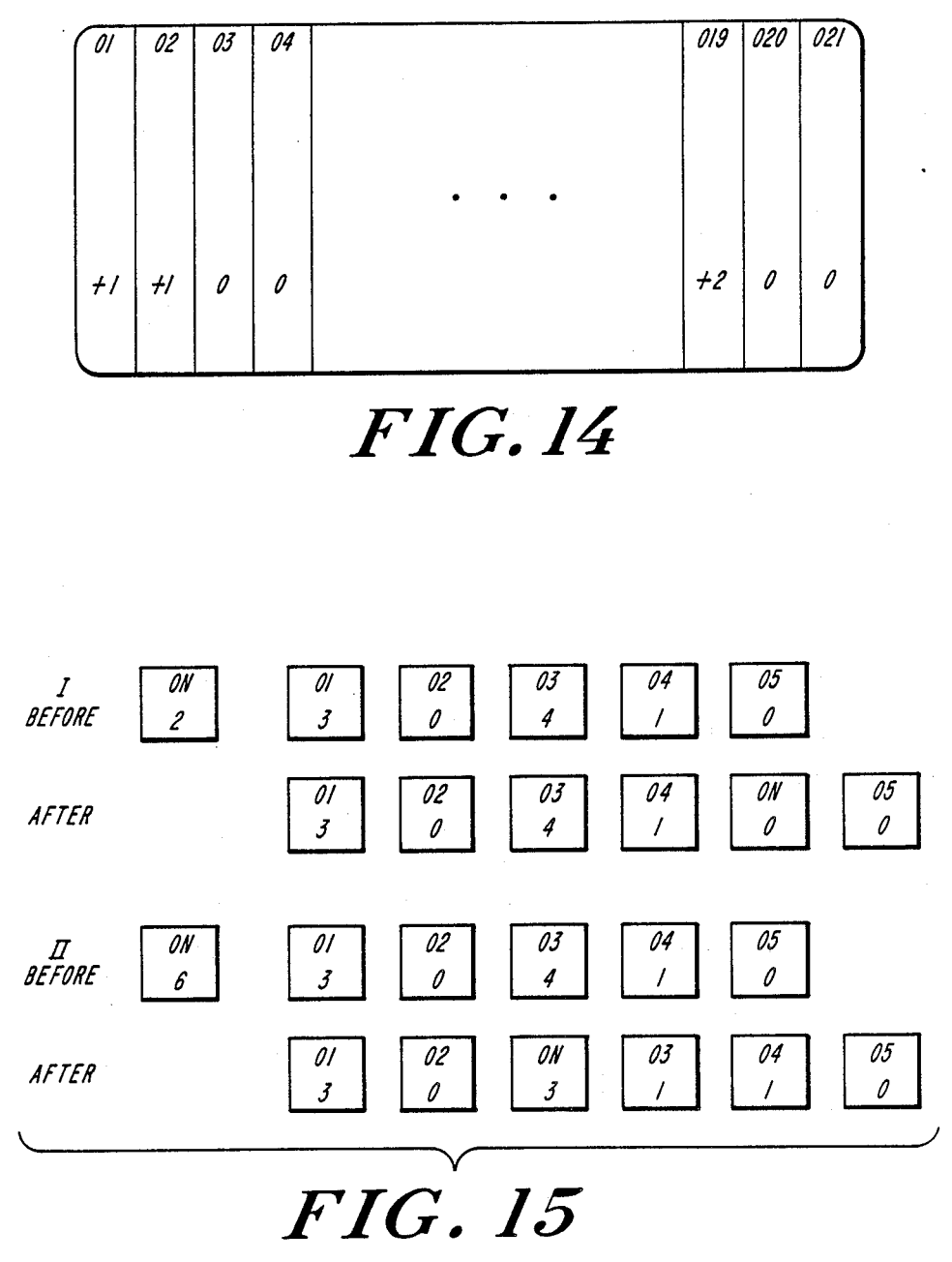
Figure 16:
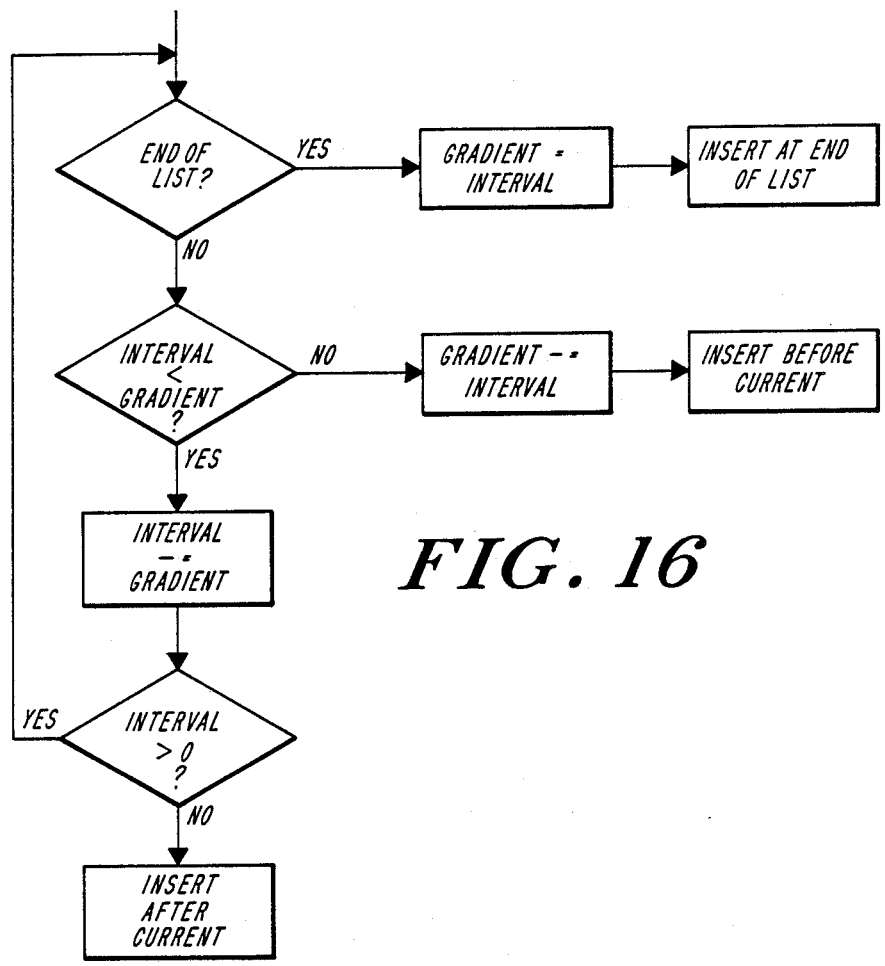
FIG. 16 is a flow chart of the scheduler process.

A significant feature of the process depicted in FIG. 13 is the scheduling algorithm executed by the scheduler section of the RTAC Processor illustrated in FIG. 5. The scheduler, operating as shown in FIGS. 14–16, ensures that when a RULE is evaluated, the associated data for that RULE is current. In accordance with the invention, the scan interval of RULE and expiration time of data can be specified.

The scheduler section of the RTAC processor preferably utilizes a queue structure similar to that depicted in FIG. 14. The queue can contain 22 objects, represented by 01 through 021. Each object is assigned to a slot, and the slot have "time gradient" values—represented by t1 through t7—associated with slot headers. A time gradient is defined herein as the period of states between a current object and the previous object. The "interim objects" of FIG. 14, which have gradients of 0, are members of a previous header. Valid objects that can be scheduled include RULES and SENSORS. SENSORS are normally scheduled when referenced in a rule by a rate or average, or are used to monitor an alarm. Scheduled RULES are referred to herein as primary RULES.

Objects are added to the list using the following technique, which is illustrated in FIG. 16. The scheduler examines the scheduler list in a stepwise manner, subtracting the gradient corresponding to each object from the interval of the new object, until one of two conditions is satisfied. Under the first condition, if the interval equals exactly zero, the new object is entered in the list immediately after the object that reduced its interval to zero, becoming a new member for this header. Under the second condition, if the interval is greater than zero but less than the gradient of the current object, the object is entered into the list in front of the current object. The new object becomes a new header having a gradient of the remaining interval, and the gradient of the current object is reduced by the remaining interval of the new object. If the entire list is traversed and no slot is found, the new object is added to the end of the list. FIG. 15 illustrates the results of this stepwise processing.

This scheduler scheme, as depicted in FIGS. 14–16, provides enhanced real-time efficiency. In particular, objects having short intervals require significantly less work to schedule. Secondly, the queue is updated by decrementing the gradient of the head slot. When the head reaches zero, the head and all members of its group are evaluated.

In a preferred embodiment of the invention, the evaluation process executed by the evaluator of FIGS. 5 and 6 can be entered from two points in the processor cycle. The first point on entry into the evaluator process is from the scheduler, upon expiration of an interval. The second entry point is from the alarm mechanism. The operations executed by the evaluator are determined by the type of object being evaluated.

When sensors are evaluated, the evaluator requests new data if the old data has expired—i.e., if the time elapsed after the most recent receipt of that data value exceeds the user-specified currency interval. If new data is not immediately available, the object is placed on an interrupt list or queue pending the arrival of the new data. As discussed above, data is available during normal operation if requested through a communications channel, which can comprise any hardware or software inter-process communications facility, including, but not limited to, conventional RS232, serial line, Ethernet, or VMS mailbox devices.

When variables are updated, the evaluator reads a list of objects which reference those variables. These objects are always RULES. If any of these rules are active in the current state, these RULES are first run. The variable is updated as a corollary of successful RULE evaluation, and this action represents the backward chaining mechanism of the processor. If the evaluation of the variable fails for any reason, the variable can be placed on an interrupt list.

Evaluation of RULES is executed in a similar manner. Prior to execution of a RULE formula, the evaluator scans a list of all objects referenced by this RULE. Each object must satisfy one of the following conditions. The data for the object must be currently residing; or the object must be currently absent from the interrupt list and must complete immediate reevaluation. If either of these criteria are not satisfied, the rule is entered on the interrupt list. Objects on the interrupt list which ultimately depend on a data request will be activated when all the data becomes current. If for any reason required data does not arrive, or the RTAC system is unable to maintain all required data current at any time, rules may remain permanently inactive. This may occur, for example, in a slow or heavily loaded network utilizing sensors with short currency intervals.

When data arrives for any object, it is stored in that object's database at the most current data point, whether requested or not. However, if the object is on the interrupt list, it has requested data. The evaluator accordingly examines all rules which reference this object, to determine whether these rules are on the interrupt queue awaiting this data. Each rule on the interrupt list is then evaluated to determine whether the rule now completes evaluation. If not, the rule remains on the interrupt list. If the rule successfully completes evaluation, it again behaves normally, and if it is a primary rule, it is re-scheduled. This effect can then cascade upwards through the interrupt chain, because the successful evaluation of a rule can cause a pending variable to be updated, which can in turn cause the successful evaluation of a secondary rule.

Figure 24:
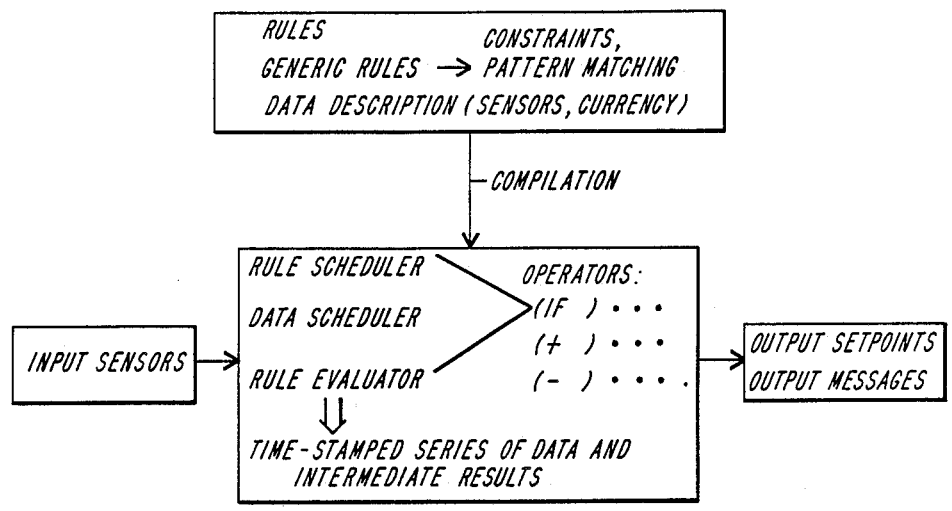
FIG. 24 is a block diagram showing the top-level and compiled modules of the RTAC control code.

In one embodiment of the invention, depicted in FIG. 24, the RTAC processor compiles a top-level language structure to generate a threaded, compiled language utilized by the inference engine. The top level language, which a plant engineer or other user can view and configure, provides constraints, pattern matching and object definitions, by implementing RULES, generic RULES, SENSORS and currency values. As FIG. 24 indicates, the top level structure is compiled, and the inference engine loads a compiled form of the knowledge base. The result is a rule scheduler, data scheduler, rule evaluator, and time series of data and intermediate results, in which each data value is time stamped and assigned a currency interval. Data from input sensors is then processed under the control of this compiled structure. The inference engine language, also referred to herein as the kernel language, supports operators such as IF, ELSE, SIN, COS, +, −, *, /, <, >, and enables pattern matching—i.e., the structuring of generic rules to which specific expressions can be matched. Runtime processing in accordance with the threaded compiled language is transparent to the user, but can be examined during remote diagnostic procedures. A preferred embodiment of the invention employs conventional parsing, data saving and restoring mechanisms for the knowledge base. The compilation process can utilize known pattern matching and substitution mechanisms for the generic RULES. See, for example, Winston and Horn, LISP, MIT Press, 1980, incorporated herein by reference.

The processes of the RTAC system can thus be implemented in three modules. The first is a "source-file" format that the user can view and configure. The second module, which resembles the LISP language discussed in the Winston and Horn publication, is compiled from the source-file, and is processed by the kernel or inference engine. The third module consists of code utilized by the simulator, or simulated data supplier unit. These modules are set forth in Appendix A attached hereto.

This top-level/kernel-level configuration provides a number of significant advantages for real-time control applications. The compiled configuration enables on-line, runtime modification of the operating system, without the necessity of taking the system off-line. Compiling the top-level or "user-level" language provides a compact knowledge base. The kernel language offers the advantages of simple implementation in a fast, reliable processor. Further, as noted above in connection with a discussion of RTAC objects, the invention permits the definition of generic rules for providing constraint matching on device or object properties. An example of a constraint is as follows:

| constraint | = | X is a device and X has type and type of X is fuel_tank |
|---|---|---|
| rule | = | If level of X > 10 then . . . |

In conventional expert systems for process control, constraint and pattern matching is executed at runtime. In accordance with the invention, however, these functions are executed at compile-time. This provides higher processing speeds and a reduced kernel language which is simple to implement and optimize. The system permits quality control and automated verification of correctness. This configuration also allows rules to be updated while the system is running, so that additional trend and advisory control tactics can be implemented without losing data histories or interrupting execution.

Compilation further permits a user-level language which users find ore natural. In particular, the user-level language of the invention more closely resembles a natural language than do control languages which rely extensively on IF, THEN, ELSE operators.

In addition to the pattern matching discussed above, the compiled module supports several forms of knowledge base optimization. One optimization method involves cross reference and elimination of unused variables. Another form of optimization utilizes in-line procedure calls and macros.

The illustrated configuration also optimizes forward chaining execution. Consider, for example, the expression

```
conclude x: = 10
```

In certain conventional expert systems, when an assignment is made, all rules are run. In accordance with the invention, however, when the processor makes the assignment of X, it schedules only those rules which reference X. Forward chaining can utilize scheduling determined at compile time, and the selection of currency evaluation and assignment of expiration-time values is made at compile time. Thus, for example, the equation $$X = Y + Z;$$

translates into

```
(= X (+ Y Z))
(set_slot X expiration
 (min (get_slot Y expiration)
      (get_slot Z expiration))
``` and

```
conclude X := value;
``` translates into

```
(    =     X value)
     (schedule rules requiring X)
``` which provides for the assignment of expiration-time values.

The assignment of expiration time values can be implemented in connection with the general purpose evaluation mechanism described above. This mechanism is similar to the LISP evaluator disclosed in the Winston and Horn publication, but optimized for record data structures. Processing speed can be enhanced by having data pre-fetched for rules that are referenced by a scheduled rule, rather than interrupting the processing of scheduled rules for execution of the backward chained rules.

Because many rules and variables depend upon data acquired over several minutes or hours, a preferred embodiment of the invention provides power failure recovery capability, including maintenance of data histories.

This is accomplished by mapping memory to disk and allocating data structures to facilitate recovery. In particular, all active data maintained in the processor can be stored in a shared global memory segment, such as by employing the global-section mechanism provided by the VMS operating system. All objects can be created in this shared memory, which is virtual memory backed up by a file on disk. A command to the operating system to optimally and consistently update the disk file can be scheduled together with the RULES, at a time interval specified by the user. Data must be updated in a consistent manner for this to work. This is a conventional technique not previously applied in real-time expert systems.

The invention can be practiced in multiprocessor apparatus using shared memory multiprocessing. The utilization of shared memory in this system minimizes interprocess communication, enables execution of diagnostic operations without slowing processing, permits running other modules without process interruption, and provides power failure recovery without additional computer resource overhead.

A preferred embodiment of the RTAC processor can therefore compile a high level user language into a threaded kernel language, acquire data from the I/O interface, sets setpoints, store object values in shared memory, provide runtime statistics, and run the scheduler illustrated in FIGS. 14–16.

In summary, the RTAC processor operates a rule-based expert system which can be event- and data-driven, for interfacing with existing distributed control systems, evaluating expressions and applying rules to monitor a process, interpret process data, diagnose fault conditions, advise operators, and provide feedback and advisory control in real-time.

It will thus be seen that the invention efficiently attains the objects set forth above, among those made apparent from the preceding description. In particular, the invention provides methods and apparatus for real-time monitoring, optimization, advisory control, prediction, and simulation of industrial processes. The RTAC processor can be integrated into an existing plant process control system to provide tactical control, advice, and closed-loop feedback. The invention solves the process industry problem of operator information overload, by interpreting plant data, predicting and diagnosing problems, and presenting advice to the operator and feedback to the control system in real-time, as the plant is operating. The invention helps process plants prevent and manage operational, safety and environmental problems before they result in process upset. The invention also allows engineers and operators to optimize processes, thereby increasing capacity and product quality, and decreasing waste products.

It will be understood that changes may be made in the above construction and in the foregoing sequences of operation without departing from the scope of the invention. Thus, for example, while the sensors are shown as being directly connected to the processor, sensor data could instead be stored in a selected memory medium for subsequent transfer and analysis, or transmitted by modem to a remote digital processor. Additionally, multiple RTAC systems can be linked by a communications channel, for plant-wide or corporation-wide advisory control. It is accordingly intended that all matter contained in the above description or shown in the accompanying drawings be interpreted as illustrative rather than in a limiting sense.

It is also to be understood that the following claims are intended to cover all of the generic and specific features of the invention as described herein, and all statements of the scope of the invention which, as a matter of language, might be said to fall therebetween.

APPENDIX A

GRAMMER OF THE USER-LEVEL RTAC LANGUAGE IS BASED ON OPERATOR
PRECEDENCE. THE GRAMMER TABLES ARE DEFINED IN TERMS OF "PROPS"
OF THE SYMBOL TOKENS INVOLVED. LBP IS LEFT BINDING POWER,
RBP IS RIGHT BINDING POWER. NUD IS A NO-TOKEN-ON-LEFT DRIVER,
LED IS A TOKEN-ON-LEFT DRIVER PROCEDURE.

GRAMMER TABLE

```
(defprops $ lbp -1 nud premterm-err)
(defprops |,| lbp 10  led parse-nary-comma nud delim-err)
(defprops |;| lbp 9)
(defprops |)| nud delim-err led erb-err lbp 5)
(defprops |(| nud open-paren-nud led open-paren-led lbp 200)
(defprops sequence header progn)
(defprops if nud if-nud rbp 45)
(defprops then nud delim-err lbp 5 rbp 25)
(defprops else nud delim-err lbp 5 rbp 25)
(defprops elseif nud delim-err lbp 4 rbp 45)
(defprops - nud parse-prefix-minus led parse-nary lbp 100 rbp 100)
(defprops + nud parse-prefix led parse-nary lbp 100 rbp 100)
(defprops * led parse-nary lbp 120)
(defprops = led parse-infix lbp 80 rbp 80)
(defprops ** lbp 140 rbp 139 led parse-infix)
(defprops |:=| led parse-infix lbp 80 rbp 80 header setf)
(defprops is led parse-infix lbp 80 rbp 80)
(defprops / led parse-infix lbp 120 rbp 120)
(defprops > led parse-infix lbp 80 rbp 80)
(defprops < led parse-infix lbp 80 rbp 80)
(defprops >= led parse-infix lbp 80 rbp 80)
(defprops <= led parse-infix lbp 80 rbp 80)
(defprops of led parse-infix lbp 145 rbp 145)
(defprops has led parse-infix lbp 145 rbp 145)
(defprops isa led parse-infix lbp 145 rbp 145)
(defprops not nud parse-prefix lbp 70 rbp 70)
(defprops and led parse-nary lbp 65)
(defprops or led parse-nary lbp 60)
(defprops every led parse-infix lbp 50 rbp 50)
(defprops conclude nud parse-prefix lbp 25 rbp 25)
(defprops define_rule nud definition-nud)
(defprops define_sensor nud definition-nud)
(defprops define_variable nud definition-nud)
(defprops define_external_system nud definition-nud)
(defprops define_message_destination nud definition-nud)
(defprops define_setpoint nud definition-nud)
(defprops define_parameters nud definition-nud)
(defprops define_device nud definition-nud)
(defprops define_icon nud definition-nud)
(defprops define_message nud definition-nud)
(defprops define_generic nud definition-nud)
(defprops do_not_edit nud do_not_edit_nud)
```

EXPRESSIONS INVOLVING THESE OPERATORS ARE PARSED, AND THEN TRANSLATED,
USING THE FOLLOWING TRANSLATION TABLE, INTO THE KERNEL RTAC LANGUAGE.

```
(defprops is translate translate-is check-formula check-formula-is)
(defprops setf translate translate-setf check-formula check-formula-setf)
(defprops send translate translate-send check-formula check-formula-send)
(defprops cond translate translate-cond check-formula check-formula-cond)
(defprops + translate translate-arithmetic identity 0 check-formula
check-formula-args)
(defprops - translate translate-arithmetic identity 0 check-formula
check-formula-args)
(defprops * translate translate-arithmetic identity 1 check-formula
check-formula-args)
(defprops / translate translate-arithmetic check-formula check-formula-args)
```

```
(defprops vms_time simple-translation vms_time nargs 0)
(defprops mod simple-translation % nargs 2)
(defprops random simple-translation rnd nargs 1)
(defprops and translate translate-and simple-translation && check-formula
 check-formula-args)
(defprops or translate translate-boolean simple-translation |\|\||
 check-formula check-formula-args)
(defprops not translate translate-boolean simple-translation ! check-formula
 check-formula-args)
(defprops progn translate translate-progn check-formula check-formula-args)
(defprops >= simple-translation >=)
(defprops <= simple-translation <=)
(defprops > simple-translation >)
(defprops < simple-translation <)
(defprops = simple-translation ==)
(defprops log simple-translation log nargs 1)
(defprops log10 simple-translation log10 nargs 1)
(defprops sin simple-translation sin nargs 1)
(defprops cos simple-translation cos nargs 1)
(defprops tan simple-translation tan nargs 1)
(defprops asin simple-translation asin nargs 1)
(defprops acos simple-translation acos nargs 1)
(defprops atan simple-translation atan nargs 1)
(defprops sqrt simple-translation sqrt nargs 1)
(defprops ** simple-translation pwr)
(defprops max simple-translation max nargs (2 100))
(defprops min simple-translation min nargs (2 100))
(defprops rate simple-translation rate nargs 3)
(defprops change simple-translation change nargs 3)
(defprops dt translate translate-dt check-formula check-formula-dt nargs 1)
(defprops ave simple-translation ave nargs 3)
(defprops abs simple-translation abs nargs 1)
(defprops conclude translate translate-conclude check-formula
 check-formula-args)
(defprops error_status simple-translation error_status nargs 1)
(defprops activate_category translate translate-category-op check-formula
 check-formula-category-op cross-walk-formula cross-walk-category-op nargs 1)
(defprops deactivate_category translate translate-category-op check-formula
 check-formula-category-op cross-walk-formula cross-walk-category-op nargs 1)
(defprops population translate translate-population check-formula
 check-formula-ignore cross-walk-formula cross-walk-ignore nargs 1)
(defprops last_value simple-translation last_value nargs 1)
(defprops nth_previous_value simple-translation last_value nargs 2)
(defprops last_time simple-translation last_time nargs 1)
(defprops problem simple-translation problem nargs 1 arg1-type1
 (sensor external_system setpoint rule variable))
(defprops bit_not simple-translation ~ nargs 1)
(defprops bit_or simple-translation |\|| nargs 2)
(defprops bit_and simple-translation |&| nargs 2)
(defprops bit_xor simple-translation |^| nargs 2)
(defprops bit_left_shift simple-translation |<<| nargs 2)
(defprops bit_right_shift simple-translation |>>| nargs 2)
```

IMPORTANT PROCEDURES FROM THE COMPILATION OF GENERIC RULES:
THE PROCEDURE GENERIC-RULE-1 GETS CALLED ON EACH GENERIC RULE.
THE GENERIC-MATCH-LOOP PROCEDURE WILL MATCH OBJECTS THAT
SATISFY THE CONTRAINTS. THE "GET" PROCEDURES USED ACCESS SLOTS
OF THE OBJECTS. ALSO SHOWN ARE THE IMPLEMENTATIONS OF THE "ISA"
AND "HAS" CONSTRAINT OPERATORS.

THE GENERIC-GENERATE-PROCEDURE USES THE BINDINGS BETWEEN ABSTRACT
CONSTRAINT VARIABLE NAMES AND ACTUAL OBJECTS COMPUTED BY THE MATCHING,
AND GENERATES A RULE VIA SYMBOL SUBSTITUTION. THIS RULE IS THEN
TREATED AS IF IT WHERE EXPLICITLY USER-WRITTEN DURING THE REST OF
THE KNOWLEDGE-BASE COMPILATION.

```
    (defun generic-rule-1 (g)
      (when (parameter 'compiler 'generic_rule_verbose)
        (writeln *warning-stream* "Generic rule: " g))
```

```
       (setq *generic-rule-counter* 0)
       (generic-match-loop (apply 'append
                                  (mapcar1 #'flatten-constraint-and
                                           (cddr (pgetp= g 'constraint))))
                    nil
                    g))

(defun generic-match-loop (cl bindings g)
     (cond ((null cl)
            (generic-generate bindings g))
           ((atom (car cl))
            (warning "bad constraint clause " (car cl)))
           ((and (symbolp (cadr (car cl)))
                 (symbolp (caddr (car cl)))
                 (memq (caar cl) '(isa has)))
            (cond ((eq (caar cl) 'has)
                   (generic-rule-has (car cl) (cdr cl) bindings g))
                  ('else
                   (generic-rule-isa (car cl) (cdr cl) bindings g))))
           ((eval-in-bindings (car cl) bindings)
            (generic-match-loop (cdr cl) bindings g))))

(defun generic-rule-isa (exp cl bindings g)
     (cond ((not (get (caddr exp) 'infolist))
            (warning "bad \"isa\" specification"))
           ('else
            (let ((cbind (assq (cadr exp) bindings)))
              (cond ((null cbind)
                     (dolist (obj (symeval (get (caddr exp) 'infolist)))
                        (generic-match-loop cl
                                            (cons (cons (cadr exp) obj)
                                                  bindings)
                                            g)))
                    ((eq (cdr cbind) (caddr exp))
                     (generic-match-loop cl bindings g)))))))

(defun generic-rule-has (exp cl bindings g)
    (let ((cbind (assq (cadr exp) bindings)))
      (cond ((null cbind)
             (dolist (s infolists)
                (dolist (obj (symeval s))
                  (cond ((pgetp= obj (caddr exp))
                         (generic-match-loop cl
                                             (cons (cons (cadr exp) obj)
                                                   bindings)
                                             g))))))
            ((pgetp= (cdr cbind) (caddr exp))
             (generic-match-loop cl bindings g)))))
```

Part 2 = Kernel language, compiled from source file.

Part 3 = Simulator module.

***************************PART 2************************

```
define_variable dF1dt_setting
no_formula;
currency = 1000000 seconds;
initial_value = 100;

define_variable dF1dt_up_fast
100;

define_variable dF1dt_down
-100;
```

```
define_variable dF1dt_up_slow
 50;

define_variable r_ip
 no_formula;
 currency = 1.0e10 seconds;
 initial_value = 0;

define_sensor F1
 currency = 5 seconds;
 simulation = F1 + dt * dF1dt;
 simulation_initial_value = 0;
 system = false;
 route = false;
 unit = false;

define_rule F1_LOW
 if F1 < 10 and dF1dt_setting is dF1dt_down then
  dF1dt is 1 and
  dF1dt_setting is dF1dt_up_fast and
  send(engineer,"F1 low limit at ",F1);
 scan = 2 seconds;
define_rule F1_HIGH
 if F1 > 100 and dF1dt_setting >= dF1dt_up_slow then
    dF1dt is -1 and
    dF1dt_setting is dF1dt_down and
    send(engineer,"F1 high limit at ",F1)
  else if F1 > 50 and dF1dt_setting >= dF1dt_up_fast then
   dF1dt is 0.5 and
   dF1dt_setting is dF1dt_up_slow and
   send(engineer,"F1 medium limit at ",F1);
 scan = 2 seconds;

define_rule r_i
 if r_ip is 0 then
  send(engineer,"initial startup at ",t) and r_ip is 1;
 scan = 10 seconds;

define_message_destination engineer
 system = engineer_x;
 control = "Hey! ";

define_external_system simulator
 kernel_interface = mbox;
 protocol = simulate;
 request_stream = "SIM_REQUEST";
 response_stream = "SIM_RESPONSE";
 spawn_command = "@RTAC_COM:SIMULATOR_SUB";
 optional_data = false;

define_external_system engineer_x
 kernel_interface = mbox;
 protocol = messages;
 request_stream = "M_ENGINEER";
 response_stream = "R_ENGINEER";
 spawn_command = "@RTAC_COM:SCREEN_SUB";
 data_supplier_terminal = false;
 data_supplier_keyboard = false;
 optional_data = false;

define_setpoint dF1dt
 simulation_initial_value = 1;
 system = false;
 route = false;

*****************************PART 2************************ compiled knowlege base from OSC
```

```
# Usual constants
c T 1;
c F 0;
c PI 3.14159265;
c e 2.71828183;

# External systems
x engineer_x mbox R_ENGINEER M_ENGINEER messages NONE;
x simulator mbox SIM_RESPONSE SIM_REQUEST simulate "OSC.SIM";
# Message Destinations
m engineer engineer_x "Hey! ";
# Process Value Sensors
p F1 NONE 5 simulator () 100;
# variables
c dF1dt_up_slow 50;
c dF1dt_down -100;
c dF1dt_up_fast 100;
v r_ip 1.000000e+10 0 () 100;
v dF1dt_setting 1000000 100 () 100;

# setpoints
s dF1dt NONE simulator;
# messages
# rules
r r_i 10
(if
 (== r_ip 0)
 (seq
  (send
   ("initial startup at " t)
   0
   engineer)
  (= r_ip 1)))
();
r F1_HIGH 2
(if
 (&&
  (> F1 100)
  (>= dF1dt_setting dF1dt_up_slow))
 (seq
  (= dF1dt -1)
  (= dF1dt_setting dF1dt_down)
  (send
   ("F1 high limit at " F1)
   0
   engineer))
 (if
  (&&
   (> F1 50)
   (>= dF1dt_setting dF1dt_up_fast))
  (seq
   (= dF1dt 0.5)
   (= dF1dt_setting dF1dt_up_slow)
   (send
    ("F1 medium limit at " F1)
    0
    engineer))))
();
r F1_LOW 2
(if
 (&&
  (< F1 10)
  (== dF1dt_setting dF1dt_down))
 (seq
  (= dF1dt 1)
  (= dF1dt_setting dF1dt_up_fast)
  (send
```

```
     ("F1 low limit at " F1)
     0
     engineer)))
();
**************************PART 3************************** compiled simulator from OSC
Usual constants
c T 1;
c F 0;
c PI 3.14159265;
c e 2.71828183;

# variables (from setpoints)
v dF1dt 1.000000e+10 1;
# variables
  v F1 5 0;
  # simulation rules
  r =F1 0
  (=
   F1
   (+
    F1
    (*
     (dt =F1)
     dF1dt)));
  r master_sim_rule 2
  F1;
```

RTAC SESSION SHOWING LOADING AND COMPILATION OF A KNOWLEDGE

```
        Welcome to MicroVMS V4.7

Username: GJC
Password:
        Welcome to MicroVMS V4.7

Last interactive login on Monday, 22-MAY-1989 15:30
    Last non-interactive login on Wednesday, 17-MAY-1989 14:42

$ rtac
Welcome to the RTAC Interface
(C) Copyright 1988, 1989 Mitech Corporation Loading "rtac.pre_ini"
Loading "rtac_exe:rtac.bin"
Loading "rtac.ini"
> openkb test
Loading "test.KBF"
"USER$DISK:[GJC.MI]TEST.KBF;1".
> downloadkb
Listing to USER$DISK:[GJC.MI]TEST.LIS;2
Compiling KB Generic rule: medval
  medval$1
    X = F1
  medval$2
    X = F2
Generating: medval$1 medval$2 category$A category$A$flag category$A$activator
            category$A$deactivator category$B category$B$flag
            category$B$activator category$B$deactivator medium_value$of$F1
            medium_value$of$F2
```

```
Default external system will be simulator
KB help file to USER$DISK:[GJC.MI]TEST.HLP;2

> quit
$ logout
  GJC         logged out at 22-MAY-1989 15:45:18.07
COMPILED KNOWLEDGE-BASE FOR RTAC SIMULATOR MODULE.

# compiled simulator from test
# Usual constants
c T 1;
c F 0;
c PI 3.14159265;
c e 2.71828183;

# variables (from setpoints)
v dF1dt 1.000000e+10 1;
# variables
v F1 5 0;
v F2 5 NONE;
# simulation rules
r =F1 0
(=
 F1
 (+
  F1
  (*
   (dt =F1)
   dF1dt)));
r =F2 0
(=
 F2
 (*
  (sin
   (/
    (* PI 2 t)
    60))
  80));
r master_sim_rule 2
(seq F2 F1);
COMPILED KNOWLEDGE-BASE FOR RTAC KERNEL MODULE.
NOTE: GENERATED RULES, CONSTANTS, AND VARIABLES.

compiled knowlege base from test

# Usual constants
c T 1;
c F 0;
c PI 3.14159265;
c e 2.71828183;

# External systems
x engineer_x async NONE M_ENGINEER messages NONE;
x simulator mbox SIM_RESPONSE SIM_REQUEST simulate "test.SIM";
# Message Destinations
m engineer engineer_x "";
# Process Value Sensors
p F1 NONE 5 simulator () 100;
p F2 NONE 5 simulator () 100;
# variables
c medium_value$of$F1 80;
c medium_value$of$F2 50;
c cat_none 0 V_STRING;
c cat_b 2 V_STRING;
c cat_a 1 V_STRING;
c no 0 V_STRING;
c yes 1 V_STRING;
```

```
c dF1dt_up_fast 100;
c dF1dt_down -100;
c dF1dt_up_slow 50;
v category$A 1.000000e+11 0 () 100;
v category$A$flag 1.000000e+11 0 () 100;
v category$B 1.000000e+11 0 () 100;
v category$B$flag 1.000000e+11 0 () 100;
v rm_v 1 0 (V_STRING) 100;
v tmp 1000000 NONE () 100;
v dF1dt_setting 1000000 100 () 100;
v r_ip 1.000000e+10 0 (V_STRING) 100;

# setpoints
s dF1dt NONE simulator;
# messages
# rules
r medval$1 10
(if
 (> F1 medium_value$of$F1)
 (send
  ("F1" " is now " F1)
  0
  engineer))
();
r medval$2 10
(if
 (> F2 medium_value$of$F2)
 (send
  ("F2" " is now " F2)
  0
  engineer))
();
r category$A$activator 0
(if
 (&&
  (== category$A 0)
  (== category$A$flag 1))
 (seq
  (set_slot r1 interval 3)
  (schedule category$A$deactivator r1)
  (= category$A 1)))
();
r category$A$deactivator 0
(if
 (&&
  (== category$A 1)
  (== category$A$flag 0))
 (seq
  (set_slot r1 interval 0)
  (= category$A 0)))
();
r category$B$activator 0
(if
 (&&
  (== category$B 0)
  (== category$B$flag 1))
 (seq
  (set_slot r2 interval 3)
  (schedule category$B$deactivator r2)
  (= category$B 1)))
();
r category$B$deactivator 0
(if
 (&&
  (== category$B 1)
  (== category$B$flag 0))
 (seq
```

```
      (set_slot r2 interval 0)
      (= category$B 0)))
();
r rm 30
(if
 (== rm_v cat_none)
 (seq
  (send
   ("activating category A")
   0
   engineer)
  (schedule category$A$activator category$A$deactivator)
  (= category$A$flag 1)
  (= rm_v cat_a))
 (if
  (== rm_v cat_a)
  (seq
   (send
    ("activating category B")
    0
    engineer)
   (schedule category$B$activator category$B$deactivator)
   (= category$B$flag 1)
   (= rm_v cat_b))
  (seq
   (send
    ("deactivating categories A and B")
    0
    engineer)
   (schedule category$A$activator category$A$deactivator)
   (= category$A$flag 0)
   (schedule category$B$activator category$B$deactivator)
   (= category$B$flag 0)
   (= rm_v cat_none))))
();
r r2 0
(if
 category$B
  (send
   ("category B must be active")
   0
   engineer))
();
r r1 0
(if
 category$A
  (send
   ("category A must be active")
   0
   engineer))
();
r F1_LOW 2
(if
 (&&
  (< F1 10)
  (== dF1dt_setting dF1dt_down))
 (seq
  (= dF1dt 1)
  (=
   tmp
   (dt dF1dt_setting))
  (= dF1dt_setting dF1dt_up_fast)
  (send
   ("F1 low limit at " F1 " last " tmp)
   0
   engineer)))
();
```

```
  r F1_HIGH 2
  (if
   (&&
    (> F1 100)
    (>= dF1dt_setting dF1dt_up_slow))
   (seq
    (= dF1dt -1)
    (=
     tmp
     (dt dF1dt_setting))
    (= dF1dt_setting dF1dt_down)
    (send
     ("F1 high limit at " F1 " last " tmp)
     0
     engineer))
   (if
    (&&
     (> F1 50)
     (>= dF1dt_setting dF1dt_up_fast))
    (seq
     (= dF1dt 0.5)
     (=
      tmp
      (dt dF1dt_setting))
     (= dF1dt_setting dF1dt_up_slow)
     (send
      ("F1 medium limit at " F1 " last " tmp)
      0
      engineer))))
();
r r_i 10
(if
 (== r_ip no)
 (seq
  (send
   ("initial startup at " t)
   0
   engineer)
  (= r_ip yes)))
();
```

·USER-LEVEL VIEW OF KNOWLEDGE-BASE FOR RTAC.

```
4$
"*** variables ***"
$
define_variable r_ip
 no_formula;
 currency = 1.0e10 seconds;
 initial_value = 0;
string_print;
$ define_variable dF1dt_up_slow
50;
$ define_variable dF1dt_down
-100;
$ define_variable dF1dt_up_fast
100;
$ define_variable dF1dt_setting
no_formula;
```

```
currency = 1000000 seconds;
initial_value = 100;
$ define_variable tmp
 no_formula;
 currency = 1000000 second;
 history_size = default;
$ define_variable yes
 1;
 string;
$ define_variable no
 0;
 string;
$ define_variable rm_v
 no_formula;
 currency = 1 second;
 initial_value = cat_none;
 history_size = default;
 string_print;
$ define_variable cat_a
 11;
 string;
$ define_variable cat_b
 12;
 string;
$ define_variable cat_none
 10;
 string;
$ "* sensors *"
$
define_sensor F2
 currency = 5 seconds;
 simulation = sin(PI*2*t / 1 minute)*80;
 system = simulator;
 medium_value = 50;
 route = false;
 unit = meters;
$ define_sensor F1
 currency = 5 seconds;
 simulation = F1 + dt * dF1dt;
 simulation_initial_value = 0;
 system = simulator;
 medium_value = 80;
 route = false;
 unit = meters;
$
```

```
"*** rules ***"
$
define_rule r_i
 if r_ip is no then
   send(engineer,"initial startup at ",t) and r_ip is yes;
 scan = 10 seconds;
$ define_rule F1_HIGH
 if F1 > 100 and dF1dt_setting >= dF1dt_up_slow then
    dF1dt is -1 and
    tmp is dt(dF1dt_setting) and
    dF1dt_setting is dF1dt_down and
    send(engineer,"F1 high limit at ",F1," last ",tmp)
  else if F1 > 50 and dF1dt_setting >= dF1dt_up_fast then
    dF1dt is 0.5 and
    tmp is dt(dF1dt_setting) and
    dF1dt_setting is dF1dt_up_slow and
    send(engineer,"F1 medium limit at ",F1," last ",tmp);
 scan = 2 seconds;
$ define_rule F1_LOW
 if F1 < 10 and dF1dt_setting is dF1dt_down then
    dF1dt is 1 and
    tmp is dt(dF1dt_setting) and
    dF1dt_setting is dF1dt_up_fast and
    send(engineer,"F1 low limit at ",F1," last ",tmp);
 scan = 2 seconds;
$ define_rule r1
  send(engineer,"category A must be active");
  scan = 3 seconds;
  category = A;
$ define_rule r2
  send(engineer,"category B must be active");
  scan = 3 seconds;
  category = B;
$ define_rule rm
  if rm_v is cat_none
    then send(engineer,"activating category A") and
         activate_category(A) and
         rm_v is cat_a else
  if rm_v is cat_a
    then send(engineer,"activating category B") and
         activate_category(B) and
         rm_v is cat_b
  else
         send(engineer,"deactivating categories A and B") and
         deactivate_category(A) and
         deactivate_category(B) and
         rm_v is cat_none;

scan = 30 seconds;
$

"*** messages ***"
$

"*** destinations ***"
$
```

```
define_parameters cross_reference
 sort_alphabetic = true;
 format_in_columns = true;
 space_between_objects = false;
 line_length = 80;
 paginate = false;
 page_length = 60;
$
"*** devices ***"
$
"*** generics ***"
$
define_generic medval
 constraint = (X isa sensor and X has medium_value);
 rule =
  if X > medium_value of X then
   send(engineer,"X"," is now ",X);
 scan = 10 seconds;
$
```

We claim:

1. Digital processing apparatus for monitoring and controlling an industrial process, the apparatus comprising processing means for processing a set of data signals representative of a corresponding set of periodically sensed process parameter values, and for generating in real-time, in response to said data signals, a set of calculated response values representative of requested process parameter values, said processing means including knowledge base means for providing knowledge relating to the industrial process, to enable said processing means to process said data signals in accordance with said knowledge, said knowledge base means including rule base means for providing a set of rules representative of said knowledge, inference engine means for calculating intermediate data values in response to said data signals and said rules, and for calculating, in real-time, said response values, in response to any of said data signals, said intermediate data values, and said rules, said inference engine means including expression evaluation means for evaluating logical expressions representative of any of said data signals, said intermediate data values, and said rules, each said logical expression including a set of variables corresponding to said data signals, time-stamp means, for determining and assigning a time-stamp value to each said data signal, said time-stamp values being representative of a time at which each said process parameter value is generated, and currency evaluation means, responsive to said time-stamp signals and to user-selected currency range values, for assigning an expiration-time value for each data signal, intermediate data value, and variable, and for discarding data signals having an expiration-time value outside a corresponding user-selected currency range value.

2. Apparatus according to claim 1, wherein said currency evaluation means includes means for assigning expiration-time values to said variables in accordance with a selected logical function of any of said variables corresponding to a given logical expression.

3. Apparatus according to claim 2, wherein said means for assigning expiration-time values includes means for assigning expiration-time values to a given variable in accordance with a lowest expiration-time value corresponding to a given logical expression.

4. Apparatus according to claim 1, further comprising sensor means, including a plurality of sensor elements, for periodically sensing said process parameter values and providing in response thereto said set of data signals representative of said process parameter values, feedback control signal generating means, coupled to said processor means, for generating control signals in response to said calculated response values, and feedback control elements, coupled to said feedback control signal generating means, for controlling the industrial process in response to said asserted control signals, to attain said requested process parameter values.

5. Apparatus according to claim 4, wherein said processing means includes sensor accessing means, responsive to said currency evaluation means, for requesting data from said sensor elements only when a data signal previously generated in correspondence with a given sensor has associated therewith an expiration-time value outside a corresponding user-selected currency range value.

6. Apparatus according to claim 1, wherein said inference engine means further includes forward chaining means for executing forward chaining of said rules in accordance with said data signals, and backward chaining means for executing backward chaining of said rules in accordance with said data signals.

7. Apparatus according to claim 1, wherein said processing means further includes alarm means, for calculating, in real-time, a set of alarm threshold values corresponding to said process parameter values, and generating an alarm signal when a sensed process parameter value exceeds a corresponding alarm threshold value.

8. Apparatus according to claim 7, further comprising display means, coupled to said processing means, for displaying any of said data signals, said calculated response values, said requested process parameter values, and said alarm signals, to advise a user in real-time.

9. Apparatus according to claim 1, wherein said processing means further includes
simulation means, for simulating said industrial process in response to user-selected process parameter values and in accordance with said knowledge.

10. Apparatus according to claim 1, further comprising
recovery means for providing recovery of processing of said data signals, without loss of said data signals, in the event of power failure.

11. Apparatus according to claim 1, wherein said inference engine means further includes
primary rule processing means for processing a first set of rules representative of a first set of knowledge relating to said industrial process, and
secondary rule processing means for processing a second set of rules representative of a second set of knowledge relating to said industrial process.

12. Apparatus according to claim 1, wherein said expression evaluation means includes
generic rule processing means for evaluating said logical expressions in response to generic rules, said generic rules being applicable to selected data signals, among a set of data signals, which satisfy a selected constraint,
said generic rule processing means including
pattern matching means for searching said set of data signals to identify said selected data signals which satisfy said selected constraint.

13. Apparatus according to claim 1, wherein said expression evaluation means includes
category processing means for assigning selected category values to said rules, and for controlling processing of said logical expressions in response to said selected category values.

14. A digital processing method for monitoring and controlling an industrial process, the method comprising the steps of
processing a set of data signals representative of a corresponding set of periodically sensed process parameter values, and
generating in real-time, in response to said data signals, a set of calculated response values representative of requested process parameter values, said processing step including
providing knowledge relating to the industrial process, to enable processing of said data signals in accordance with said knowledge,
said providing step including providing a set of rules representative of said knowledge,
calculating intermediate data values in response to said data signals and said rules,
calculating in real-time said response values, in response to any of said data signals, said intermediate data values, and said rules,
said calculating steps including evaluating logical expressions representative of any of said data signals, said intermediate data values, and said rules, each said logical expression including a set of variables corresponding to said data signals,
assigning a time-stamp value to each said data signal, said time-stamp values being representative of a time at which each said process parameter value is generated,
assigning, responsive to said time-stamp signals and to user-selected currency range values, an expiration-time value for each data signal, intermediate data value, and variable, and
discarding data signals having an expiration-time value outside a corresponding user-selected currency range value.

15. A method according to claim 14, further comprising the steps of
configuring a plurality of sensor elements for periodically sensing said process parameter values and providing in response thereto said set of data signals representative of said process parameter values,
generating control signals in response to said calculated response values, and
controlling the industrial process in response to said asserted control signals, to attain said requested process parameter values.

16. A method according to claim 15, wherein said processing step includes the step of
requesting data from said sensor elements only when a data signal previously generated in correspondence with a given sensor has associated therewith an expiration-time value outside a corresponding user-selected currency range value.

17. A method according to claim 14, wherein said calculating step further includes
executing forward chaining of said rules in accordance with said data signals, and
executing backward chaining of said rules in accordance with said data signals.

18. A method according to claim 14, wherein said processing step further includes the steps of
calculating, in real-time, a set of alarm threshold values corresponding to said process parameter values, and
generating an alarm signal when a sensed process parameter value exceeds a corresponding alarm threshold value.

19. A method according to claim 18, further comprising the step of
displaying any of said data signals, said calculated response values, said requested process parameter values, and said alarm signals, to advise a user in real-time.

20. A method according to claim 14, wherein said processing step further includes
simulating said industrial process in response to user-selected process parameter values and in accordance with said knowledge.

21. A method according to claim 14, further comprising the step of
providing recovery of processing of said data signals, without loss of said data signals, in the event of power failure.

22. A method according to claim 14, wherein said currency evaluation step includes
assigning expiration-time values to said variables in accordance with a selected logical function of any of said variables corresponding to a given logical expression.

23. A method according to claim 22, wherein said step of assigning expiration-time values includes assigning expiration-time values to a given variable in accordance with a lowest expiration-time value corresponding to a given logical expressi,on.

24. A method according to claim 14, wherein said calculating step further includes
processing a first set of rules representative of a first set of knowledge relating to said industrial process, and
processing a second set of rules representative of a second set of knowledge relating to said industrial process.

25. A method according to claim 14, wherein said evaluating step includes the step of
responding to generic rules to evaluate said logical expressions, said generic rules being applicable to selected data signals, among a set of data signals, which satisfy a selected constraint,
said responding step including the step of
searching said set of data signals to identify said selected data signals which satisfy said selected constraint.

26. A method according to claim 14, wherein said evaluating step includes the steps of
assigning selected category values to said rules, and
controlling processing of said logical expressions in response to said selected category values.

* * * * *